US008989885B2

(12) United States Patent
Wabnik et al.

(10) Patent No.: US 8,989,885 B2
(45) Date of Patent: Mar. 24, 2015

(54) WATERMARK GENERATOR, WATERMARK DECODER, METHOD FOR PROVIDING A WATERMARK SIGNAL IN DEPENDENCE ON BINARY MESSAGE DATA, METHOD FOR PROVIDING BINARY MESSAGE DATA IN DEPENDENCE ON A WATERMARKED SIGNAL AND COMPUTER PROGRAM USING A TWO-DIMENSIONAL BIT SPREADING

(75) Inventors: Stefan Wabnik, Oldenburg (DE); Jörg Pickel, Happurg (DE); Bert Greevenbosch, Rotterdam (NL); Bernhard Grill, Lauf (DE); Ernst Eberlein, Grossenseebach (DE); Giovanni Del Galdo, Martinroda (DE); Stefan Krägeloh, Erlangen (DE); Reinhard Zitzmann, Baiersdorf (DE); Tobias Bliem, Erlangen (DE); Marco Breiling, Erlangen (DE); Juliane Borsum, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 170 days.

(21) Appl. No.: 13/584,894

(22) Filed: Aug. 14, 2012

(65) Prior Publication Data

US 2013/0211564 A1 Aug. 15, 2013

Related U.S. Application Data

(63) Continuation of application No. PCT/EP2011/052622, filed on Feb. 22, 2011.

(30) Foreign Application Priority Data

Feb. 26, 2010 (EP) .................................... 10154960

(51) Int. Cl.
*G06F 17/00* (2006.01)
*H04K 1/02* (2006.01)

(Continued)

(52) U.S. Cl.
CPC .............. *G10L 19/018* (2013.01); *H04H 20/14* (2013.01); *H04H 60/29* (2013.01)
USPC ................ 700/94; 380/253; 380/274; 381/56

(58) Field of Classification Search
CPC ....... H04H 20/14; H04H 20/16; H04H 60/29; H04H 60/33; G10L 19/018
USPC ..................... 700/94; 381/56; 341/50, 51, 82; 380/253, 274; 382/100; 713/176
See application file for complete search history.

(56) References Cited

U.S. PATENT DOCUMENTS 5,450,490 A 9/1995 Jensen et al.
6,421,445 B1 * 7/2002 Jensen et al. ................. 380/253

(Continued)

FOREIGN PATENT DOCUMENTS

CN 101185121 A 5/2008
CN 101263552 A 9/2008

(Continued)

OTHER PUBLICATIONS

Official Communication issued in corresponding Japanese Patent Application No. 2012-554324, mailed on Oct. 1, 2013.

(Continued)

*Primary Examiner* — Jesse Elbin
(74) *Attorney, Agent, or Firm* — Keating & Bennett, LLP

(57) ABSTRACT

A watermark generator for providing a watermark signal in dependence on binary message data includes an information processor configured to provide, in dependence on a single message bit of the binary message data, a 2-dimensional spread information representing the message bit in the form of a set of time-frequency-domain values. The watermark generator also includes a watermark signal provider configured to provide the watermark signal on the basis of the 2-dimensional spread information.

A watermark detector, methods and computer programs are also described.

18 Claims, 37 Drawing Sheets

(51) Int. Cl.
*H04K 1/00* (2006.01)
*H04R 29/00* (2006.01)
*G10L 19/018* (2013.01)
*H04H 20/14* (2008.01)
*H04H 60/29* (2008.01)

(56) References Cited

U.S. PATENT DOCUMENTS

| | | | | |
|---|---|---|---|---|
| 6,584,138 | B1 | 6/2003 | Neubauer et al. | |
| 7,671,766 | B2 * | 3/2010 | Pang et al. | 341/50 |
| 2003/0185417 | A1 * | 10/2003 | Alattar et al. | 382/100 |
| 2005/0147248 | A1 | 7/2005 | Lemma et al. | |
| 2007/0291848 | A1 | 12/2007 | Aijala et al. | |
| 2009/0076826 | A1 | 3/2009 | Voessing et al. | |
| 2009/0235079 | A1 | 9/2009 | Baum et al. | |
| 2010/0021003 | A1 | 1/2010 | Baum et al. | |
| 2011/0164784 | A1 | 7/2011 | Grill et al. | |

FOREIGN PATENT DOCUMENTS

| | | | |
|---|---|---|---|
| DE | 196 40 814 | C2 | 7/1998 |
| DE | 10 2008 014 311 | A1 | 9/2009 |
| JP | 2-206233 | A | 8/1990 |
| JP | 10-500263 | T2 | 1/1998 |
| JP | 2001-022366 | A | 1/2001 |
| JP | 2005-521909 | A | 7/2005 |
| JP | 2006-154851 | A | 6/2006 |
| JP | 2006-251676 | A | 9/2006 |
| JP | 2010-503034 | A | 1/2010 |
| JP | 2010-026242 | A | 2/2010 |
| JP | 2010-044147 | A | 2/2010 |
| WO | 93/07689 | A1 | 4/1993 |
| WO | 94/11989 | A1 | 5/1994 |
| WO | 95/27349 | A1 | 10/1995 |

OTHER PUBLICATIONS

Blahut, “Digital Transmission of Information”, Section 3.6, “Differential Phase Shift Keying”, published by Morikita Publishing Company, Japan, Mar. 31, 1997, First Version, pp. 122-123.

Official Communication issued in corresponding Japanese Patent Application No. 2012-554322, mailed on Sep. 25, 2013.

Kirovski et al., “Robust Spread-Spectrum Audio Watermarking”, 2001 IEEE International Conference on Acoustics, Speech and Signal Processing, vol. 3, May 7, 2001, 4 pages.

Official Communication issued in International Patent Application No. PCT/EP2011/052622, mailed on May 30, 2011.

Kirovski et al., “Spread-Spectrum Audio Watermarking: Requirements, Applications, and Limitations,” IEEE Fourth Workshop Multimedia Signal Processing, Oct. 3, 2001, pp. 219-224.

Kirovski et al., “Robust Covert Communication Over a Public Audio Channel Using Spread Spectrum,” Lecture Notes in Computer Science, vol. 2137/2001, Jan. 1, 2001, pp. 354-368.

English translation of Official Communication issued in corresponding Chinese Patent Application No. 201180020590.9, mailed on Jul. 9, 2013.

Official Communication issued in corresponding Chinese Patent Application No. 201180020595.1, mailed on Dec. 12, 2013.

Official Communication issued in corresponding Chinese Patent Application No. 201180020760.3, mailed on Oct. 29, 2013.

Tachibana et al., “An Audio Watermaking Method Using a Two-Dimensional Pseudo-Random Array,” Signal Processing 82, 2002, pp. 1455-1469.

Wabnik et al., “Watermark Generator, Watermark Decoder, Method for Providing a Watermark Signal in Dependence on Binary Message Data, Method for Providing Binary Message Data in Dependence on a Watermarked Signal and Computer Program Using a Differential Encoding,” U.S. Appl. No. 13/588,165, filed Aug. 17, 2012.

Wabnik et al., “Watermark Decoder and Method for Providing Binary Message Data,” U.S. Appl. No. 13/589,696, filed Aug. 20, 2012.

Wabnik et al., “Watermark Signal Provision and Watermark Embedding,”, U.S. Appl. No. 13/593,016, filed Aug. 23, 2012.

Wabnik et al., “Watermark Generator, Watermark Decoder, Method for Providing a Watermark Signal, Method for Providing Binary Message Data in Dependence on a Watermarked Signal and a Computer Program Using Improved Synchronization Concept,”, U.S. Appl. No. 13/592,992, filed Aug. 23, 2012.

Zitzmann et al., “Watermark Signal Provider and Method for Providing a Watermark Signal,”, U.S. Appl. No. 13/593,999, filed Aug. 24, 2012.

Official Communication issued in corresponding Japanese Patent Application No. 2012-554326, mailed on Nov. 11, 2014.

* cited by examiner

WATERMARK GENERATOR, WATERMARK DECODER, METHOD FOR PROVIDING A WATERMARK SIGNAL IN DEPENDENCE ON BINARY MESSAGE DATA, METHOD FOR PROVIDING BINARY MESSAGE DATA IN DEPENDENCE ON A WATERMARKED SIGNAL AND COMPUTER PROGRAM USING A TWO-DIMENSIONAL BIT SPREADING

CROSS-REFERENCE TO RELATED APPLICATIONS

This application is a continuation of copending International Application No. PCT/EP2011/052622, filed Feb. 22, 2011, which is incorporated herein by reference in its entirety, and additionally claims priority from European Application No. EP 10154960.8, filed Feb. 26, 2010, which is also incorporated herein by reference in its entirety.

BACKGROUND OF THE INVENTION

Embodiments according to the invention are related to a watermark generator for providing a watermark signal in dependence on binary message data. Further embodiments according to the invention relate to a watermark decoder for providing binary message data in dependence on a watermarked signal. Further embodiments according to the invention are related to a method for providing a watermark signal in dependence on binary message data. Further embodiments according to the invention are related to a method for providing binary message data in dependence on a watermarked signal. Further embodiments are related to corresponding computer programs.

Some embodiments according to the invention are related to a robust low complexity audio watermarking system.

In many technical applications, it is desired to include an extra information into an information or signal representing useful data or "main data" like, for example, an audio signal, a video signal, graphics, a measurement quantity and so on. In many cases, it is desired to include the extra information such that the extra information is bound to the main data (for example, audio data, video data, still image data, measurement data, text data, and so on) in a way that it is not perceivable by a user of said data. Also, in some cases it is desirable to include the extra data such that the extra data are not easily removable from the main data (e.g. audio data, video data, still image data, measurement data, and so on).

This is particularly true in applications in which it is desirable to implement a digital rights management. However, it is sometimes simply desired to add substantially unperceivable side information to the useful data. For example, in some cases it is desirable to add side information to audio data, such that the side information provides an information about the source of the audio data, the content of the audio data, rights related to the audio data and so on.

For embedding extra data into useful data or "main data", a concept called "watermarking" may be used. Watermarking concepts have been discussed in the literature for many different kinds of useful data, like audio data, still image data, video data, text data, and so on.

In the following, some references will be given in which watermarking concepts are discussed. However, the reader's attention is also drawn to the wide field of textbook literature and publications related to the watermarking for further details.

DE 196 40 814 C2 describes a coding method for introducing a non-audible data signal into an audio signal and a method for decoding a data signal, which is included in an audio signal in a non-audible form. The coding method for introducing a non-audible data signal into an audio signal comprises converting the audio signal into the spectral domain. The coding method also comprises determining the masking threshold of the audio signal and the provision of a pseudo noise signal. The coding method also comprises providing the data signal and multiplying the pseudo noise signal with the data signal, in order to obtain a frequency-spread data signal. The coding method also comprises weighting the spread data signal with the masking threshold and overlapping the audio signal and the weighted data signal.

In addition, WO 93/07689 describes a method and apparatus for automatically identifying a program broadcast by a radio station or by a television channel, or recorded on a medium, by adding an inaudible encoded message to the sound signal of the program, the message identifying the broadcasting channel or station, the program and/or the exact date. In an embodiment discussed in said document, the sound signal is transmitted via an analog-to-digital converter to a data processor enabling frequency components to be split up, and enabling the energy in some of the frequency components to be altered in a predetermined manner to form an encoded identification message. The output from the data processor is connected by a digital-to-analog converter to an audio output for broadcasting or recording the sound signal. In another embodiment discussed in said document, an analog bandpass is employed to separate a band of frequencies from the sound signal so that energy in the separated band may be thus altered to encode the sound signal.

U.S. Pat. No. 5,450,490 describes apparatus and methods for including a code having at least one code frequency component in an audio signal. The abilities of various frequency components in the audio signal to mask the code frequency component to human hearing are evaluated and based on these evaluations an amplitude is assigned to the code frequency component. Methods and apparatus for detecting a code in an encoded audio signal are also described. A code frequency component in the encoded audio signal is detected based on an expected code amplitude or on a noise amplitude within a range of audio frequencies including the frequency of the code component.

WO 94/11989 describes a method and apparatus for encoding/decoding broadcast or recorded segments and monitoring audience exposure thereto. Methods and apparatus for encoding and decoding information in broadcasts or recorded segment signals are described. In an embodiment described in the document, an audience monitoring system encodes identification information in the audio signal portion of a broadcast or a recorded segment using spread spectrum encoding. The monitoring device receives an acoustically reproduced version of the broadcast or recorded signal via a microphone, decodes the identification information from the audio signal portion despite significant ambient noise and stores this information, automatically providing a diary for the audience member, which is later uploaded to a centralized facility. A separate monitoring device decodes additional information from the broadcast signal, which is matched with the audience diary information at the central facility. This monitor may simultaneously send data to the centralized facility using a dial-up telephone line, and receives data from the centralized facility through a signal encoded using a spread spectrum technique and modulated with a broadcast signal from a third party.

WO 95/27349 describes apparatus and methods for including codes in audio signals and decoding. An apparatus and methods for including a code having at least one code frequency component in an audio signal are described. The abilities of various frequency components in the audio signal to mask the code frequency component to human hearing are evaluated, and based on these evaluations, an amplitude is assigned to the code frequency components. Methods and apparatus for detecting a code in an encoded audio signal are also described. A code frequency component in the encoded audio signal is detected based on an expected code amplitude or on a noise amplitude within a range of audio frequencies including the frequency of the code component.

However, in the known watermarking systems, bit error rates are sometimes unsatisfactory. Also, the decoding complexity is sometimes very high, for example if very long spreading sequences are used. In addition, some conventional systems are sensitive to distortions of the watermarked signal by narrow band sources of distortion and/or pulse-like sources of distortion.

SUMMARY

According to an embodiment, a watermark generator for providing a watermark signal in dependence on binary message data may have: an information processor configured to provide, in dependence on a single message bit of the binary message data, a 2-dimensional spread information representing the message bit in the form of a set of time-frequency-domain values; and a watermark signal provider configured to provide the watermark signal on the basis of the 2-dimensional spread information; wherein the information processor is configured to spread a first message bit in a first spreading direction using a first spread sequence and to spread a second message bit in the first spreading direction using the first spread sequence, in order to obtain an intermediate information representation, to combine the intermediate information representation with an overlay information representation, in order to obtain a combined information representation, and to spread the combined information representation in a second direction using a second spread sequence, in order to obtain the 2-dimensional spread information, wherein the information processor is configured to combine the intermediate information representation with an overlay information representation, which is spread in the first spreading direction using a plurality of overlay information spreading sequences, such that the first spread message bit is multiplied with a first overlay information spread sequence, and such that the second spread message bit is multiplied with a second overlay information spread sequence, wherein the first overlay information spread sequence and the second overlay information spread sequence are orthogonal.

According to another embodiment, a watermark decoder for providing binary message data in dependence on a watermarked signal may have: a time-frequency-domain representation provider configured to provide a time-frequency-domain representation of the watermarked signal; a synchronization determinator including a despreader having one or more despreader blocks, wherein the despreader is configured to perform a 2-dimensional despreading in order to obtain a synchronization information in dependence on a 2-dimensional portion of the time-frequency-domain representation; and a watermark extractor configured to extract the binary message data from the time-frequency-domain representation of the watermarked signal using the synchronization information; wherein the despreader is configured to obtain a set of temporally despread values, wherein the despreader is configured to multiply a plurality of values of the time-frequency-domain representation with values of a temporal despread sequence, and to add results of the multiplications in order to obtain one of the temporally despread values, and wherein the despreader is configured to multiply the temporally despread values with values of a frequency despread sequence in an element-wise manner, and to add results of the multiplications to obtain a 2-dimensionally despread value; wherein the despreader is configured to multiply subsequent sets of temporally despread values with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

According to another embodiment, a watermark decoder for providing binary message data in dependence on a watermarked signal may have: a time-frequency-domain representation provider configured to provide a time-frequency-domain representation of the watermarked signal; and a watermark extractor including a despreader having one or more despreader blocks, wherein the despreader is configured to perform a 2-dimensional despreading in order to obtain a bit of the binary message data in dependence on a 2-dimensional portion of the time-frequency-domain representation; wherein the despreader is configured to obtain a set of temporally despread values, wherein the despreader is configured to multiply a plurality of values of the time-frequency-domain representation with values of a temporal despread sequence, and to add results of the multiplications in order to obtain one of the temporally despread values, and wherein the despreader is configured to multiply the temporally despread values with values of a frequency despread sequence in an element-wise manner, and to add results of the multiplications to obtain a 2-dimensionally despread value; wherein the despreader is configured to multiply subsequent sets of temporally despread values with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

According to another embodiment, a method for providing a watermark signal in dependence on binary message data may have the steps of: providing, in dependence on a single message bit of the binary message data, a 2-dimensional spread information representing the message bit in the form of a set of time-frequency-domain values; and providing the watermark signal on the basis of the 2-dimensional spread information; wherein a first message bit is spread in a first spreading direction using a first spread sequence and a second message bit is spread in the first spreading direction using the first spread sequence, in order to obtain an intermediate information representation, and wherein the intermediate information representation is combined with an overlay information representation, in order to obtain a combined information representation, and wherein the combined information representation is spread in a second direction using a second spread sequence, in order to obtain the 2-dimensional spread information, wherein the intermediate information representation is combined with an overlay information representation, which is spread in the first spreading direction using a plurality of overlay information spreading sequences, such that the first spread message bit is multiplied with a first overlay information spread sequence, and such that the second spread message bit is multiplied with a second overlay information spread sequence, wherein the first overlay information spread sequence and the second overlay information spread sequence are orthogonal.

According to another embodiment, a method for providing binary message data in dependence on a watermarked signal may have the steps of: providing a time-frequency-domain representation of the watermarked signal; and performing a 2-dimensional despreading in order to obtain a bit of the binary message data or a synchronization information used to extract the binary message data from the time-frequency-domain representation of the watermark signal in dependence on a 2-dimensional portion of the time-frequency-domain representation; wherein a set of temporally despread values is obtained, wherein a plurality of values of the time-frequency-domain representation is multiplied with values of a temporal despread sequence, and wherein results of the multiplications are added in order to obtain one of the temporally despread values, and wherein the temporally despread values are multiplied with values of a frequency despread sequence in an element-wise manner, and wherein results of the multiplications are added to obtain a 2-dimensionally despread value; wherein subsequent sets of temporally despread values are multiplied with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

Another embodiment may have a computer program for performing the inventive methods, when the computer program runs on a computer.

An embodiment according to the invention creates a watermark generator for providing a watermark signal in dependence on binary message data. The watermark generator comprises an information processor configured to provide, in dependence on a single message bit, a two-dimensional spread information representing the message bit in the form of a set of time-frequency-domain values. The watermark generator also comprises a watermark signal provider configured to provide the watermark signal on the basis of the two-dimensional spread information.

It is the key idea of the present invention that a reliability of the transmission of a bit of the binary message data in the form of a watermark signal can be significantly improved by spreading the single message bit in both time and frequency. Accordingly, a particularly high degree of redundancy is achieved. Also, a good robustness against typical sources of distortion degrading the watermark signal is obtained, because many typical sources of distortion are either narrow band or short term (pulse like). Thus, by providing a two-dimensional spread information representing a single message bit, the information of the single message bit is transmitted in a plurality of frequency bands, such that a narrow band distortion (such as a narrow band distortion signal or a transfer function null) typically does not prevent a correct detection of the bit, and the information describing the bit is also distributed over a plurality of time intervals, such that a short click-type (pulse-like) distortion, which affects only one time interval or only a small number of time intervals (significantly smaller than the number of time intervals across which the single bit information is spread) typically does not eliminate the chance to recover the message bit with good reliability.

To summarize, the described concept provides an increased reliability to correctly receive a single bit of the binary message data at the side of a watermark decoder.

In an embodiment, the information processor is configured to spread the message bit in a first spreading direction using a first spread sequence, in order to obtain an intermediate information representation, to combine the intermediate information representation with an overlay information representation, in order to obtain a combined information representation, and to spread the combined information representation in a second direction using a second spread sequence, in order to obtain the two-dimensional spread information. The usage of this mixed concept, in which separate spread sequences are used for the spreading of the message bit and the overlay information (for example a synchronization information) in the frequency direction, and in which a common spread sequence is used for the spreading in the time direction facilitates the coding while still maintaining the possibility to properly separate the message bit and the overlap information (e.g. the synchronization information). According to this concept, particularly reliable acquisition of a synchronization can be obtained, if the overlay information is a synchronization information. In this case, it is particularly advantageous that both the binary message data and the synchronization information are encoded using a common time spread sequence, because the time despreading has to be executed at the decoder for a plurality of positional choices in order to acquire the synchronization. By using the same time spread sequence for the binary message data and the synchronization information, which is an example of an overlay information, the computational effort can be reduced and the synchronization can be facilitated.

In an embodiment, the information processor is configured to combine the intermediate information representation with an overlay information representation, which is spread in the first spreading direction using an overlay information spreading sequence, such that the message bit and the overlay information are spread with different spreading sequences in the first spreading direction, and such that the combination of the message bit and the overlay information is spread with a common spreading sequence in the second spreading direction.

In an embodiment, the information processor is configured to multiplicatively combine the intermediate information representation with the overlay information representation, and to spread the combined information representation, which comprises product values formed in dependence on values of the intermediate information representation and values of the overlap information, in the second spreading direction using the second spreading sequence, such that the product values are spread using a common spread sequence. A multiplicative combination of the intermediate information representation and the overlay information representation is particularly advantageous, because such a combination results in a data-independent energy of the values of the combined information representation, if magnitudes or absolute values of the elements of the intermediate information representation and/or the overlay information representation are independent on the binary message data. This facilitates an inaudible embedding of the combined information representation into a useful signal, for example an audio signal. Also, the application of the common spread sequence to the product values allows for a simple decoding, as discussed below.

In an embodiment, the information processor is configured to selectively spread a given message bit onto a first bit representation, which is a positive multiple of a bit spread sequence, or onto a second bit representation, which is a negative multiple of the bit spread sequence, in dependence on the value of the given bit, in order to spread the message bit in the first spreading direction. By spreading different values of the given message bit onto linearly dependent spreading sequences, the decoding can be facilitated, because a single correlation will be sufficient.

In an embodiment, the information processor is configured to map a given value of an intermediate information representation, which is obtained by spreading the message bit in the first direction, or a given value of a combined information representation, which is obtained by spreading the message bit in the first spreading direction and combining the result thereof with an overlay information representation, onto a set of spread values, such that the set of spread values is a scaled version of a second spread sequence, scaled in accordance with the given value. By using such a spreading in the second spreading direction, the spreading pattern can be obtained with very low complexity and minimum computational effort. The spreading in the first spreading direction and the spreading in the second spreading direction are performed substantially independently in this case, such that the spreader at the encoder side can have a simple structure and such that the despreader at the decoder side can be constructed in a very simple way also. In particular, a separate spreading in the time direction and the frequency direction can be performed at the encoder side, which reduces computational complexity significantly, and which allows the introduction of overlay information. At the decoder side, it is not necessitated to correlate the time-frequency-domain representation of the watermarked signal with a full two-dimensional pattern. Rather, it is sufficient to perform correlation in the time direction and the frequency direction in separate steps.

An embodiment according to the invention creates a watermark decoder for providing binary message data in dependence on a watermarked signal. The watermark decoder comprises a time-frequency-domain representation provider configured to provide a time-frequency-domain representation of the watermarked signal, and a synchronization determinator comprising a despreader. The despreader comprises one or more despreader blocks, and the despreader is configured to perform a two-dimensional despreading in order to obtain a synchronization information in dependence on a two-dimensional portion of the time-frequency-domain representation. The watermark decoder also comprises a watermark extractor configured to extract the binary message data from the time-frequency-domain representation of the watermark signal using the synchronization information.

Yet another embodiment according to the invention creates a watermark decoder for providing binary message data in dependence on a watermarked signal. The watermark decoder comprises a time-frequency-domain representation provider configured to provide a time-frequency-domain representation of the watermarked signal and a watermark extractor comprising a despreader having one or more despreader blocks. The despreader is configured to perform a two-dimensional despreading in order to obtain a bit of the binary message data in dependence on a two-dimensional portion of the time-frequency-domain representation.

The latter two embodiments according to the invention are based on the finding that both the synchronization and a bit of binary message data can be acquired with good precision and reliability by performing a two-dimensional despreading. Accordingly, the watermark decoders allow for a realization of the advantages discussed above with respect to the watermark generator.

In an embodiment, the despreader is configured to multiply a plurality of values of the time-frequency-domain representation with values of a temporal despread sequence and to add the results of the multiplications in order to obtain a temporally despread value. The despreader is configured to multiply a plurality of temporally despread values associated with different frequencies of the time-frequency-domain representations, or values derived therefrom, with a frequency despread sequence in an element-wise manner and to add results of the multiplication in order to obtain a two-dimensionally despread value. This embodiment implements a particularly simple and easy-to-implement despreading concept, in which a temporal despreading is performed independently from a frequency despreading. Accordingly, the watermark decoder can have a relatively simple hardware structure, in which many components may for example be reused, while still providing good performance and high reliability.

In an embodiment, the despreader is configured to obtain a set of temporally despread values. The despreader is configured to multiply a plurality of values of the time-frequency-domain representation with values of a temporal despread sequence, and to add results of the multiplication in order to obtain one of the temporally despread values. The despreader is also configured to multiply the temporally despread values with values of a frequency despread sequence in an element-wise manner, and to add results of the multiplications to obtain a two-dimensionally despread value.

In an embodiment, the despreader is configured to multiply subsequent sets of temporally despread values with values of different frequency despread sequences in an element-wise manner, such that a first set of the temporally despread values effectively multiplied in an element-wise manner and in a 1-step or multi-step multiplication, with a first combined frequency despread sequence, which is a product of a common frequency despread sequence and a first overlay despread sequence, and such that a second set of the temporally despread values is effectively multiplied, in an element-wise manner and in a 1-step or a multi-step multiplication, with a second combined frequency despread sequence, which is a product of the common frequency despread sequence and a second overlay despread sequence, which is different from the first overlay frequency despread sequence. Using this concept, an alignment of bits can be identified while keeping the extraction of the data contents reasonably simple. As one of the frequency despread sequences is variable, while the other frequency despread sequence is fixed, a number of possible combinations is kept small. On the other hand, by using different frequency despread sequences for different time portions, a temporal alignment may nevertheless be determined.

Further embodiments according to the invention create a method for providing a watermark signal in dependence on binary message data and a method for providing binary message data in dependence on a watermarked signal. Also, some embodiments create a computer program for performing one or both of said methods. The methods and the computer program are based on the same findings as the above apparatus, such that the above explanations also hold.

BRIEF DESCRIPTION OF THE DRAWINGS

Embodiments of the present invention will be detailed subsequently referring to the appended drawings, in which.

DETAILED DESCRIPTION OF THE INVENTION

1. Watermark Generation

Figure 24:
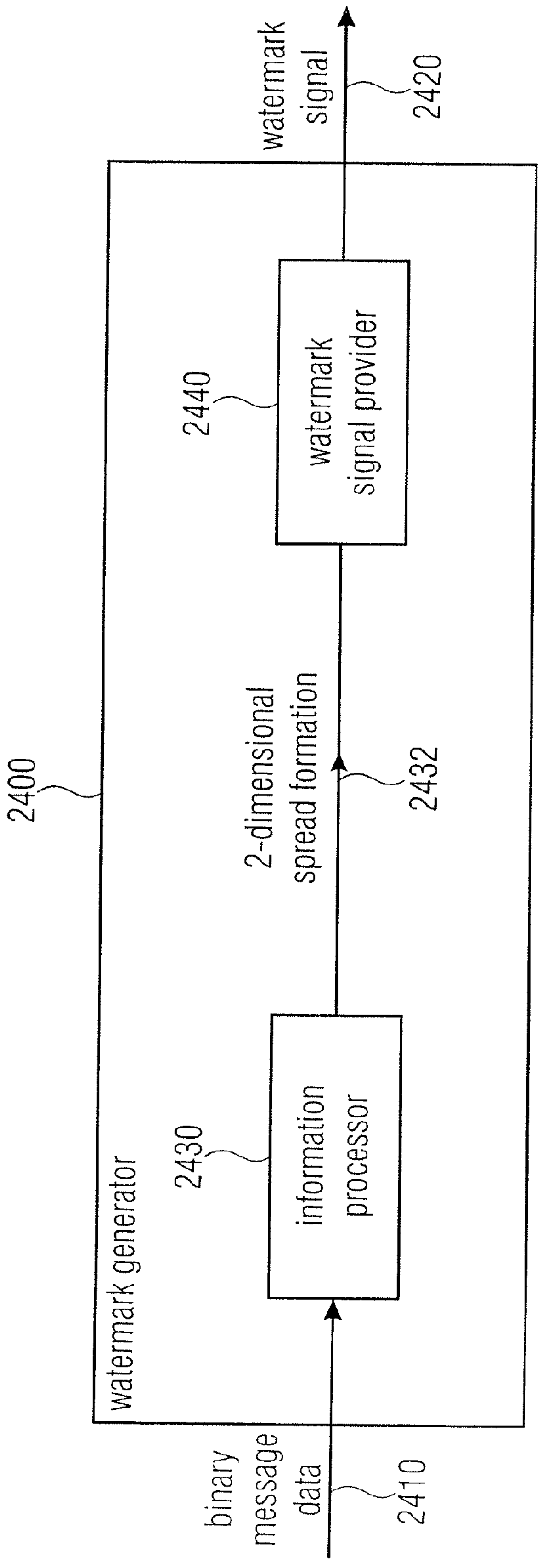
FIG. 24 shows a block-schematic diagram of a watermark generator, according to an embodiment of the invention.

1.1 Watermark Generator According to FIG. 24

In the following, a watermark generator 2400 will be described taking reference to FIG. 24, which shows a block schematic diagram of such a watermark generator. The watermark generator 2400 is configured to receive binary message data 2410 and to provide, on the basis thereof, a watermark signal 2420. The watermark generator comprises an information processor 2430, which is configured to provide, in dependence on a single message bit of the binary message data 2410, a two-dimensional spread information 2432 representing the message bit in the form of a set of time-frequency-domain values. The watermark generator 2400 also comprises a watermark signal provider 2440, which is configured to provide the watermark signal 2420 on the basis of the two-dimensional spread information 2432.

The watermark generator 2400 may be supplemented by any of the features and functionalities which are discussed in more detail in section 3 below.

Figure 26:
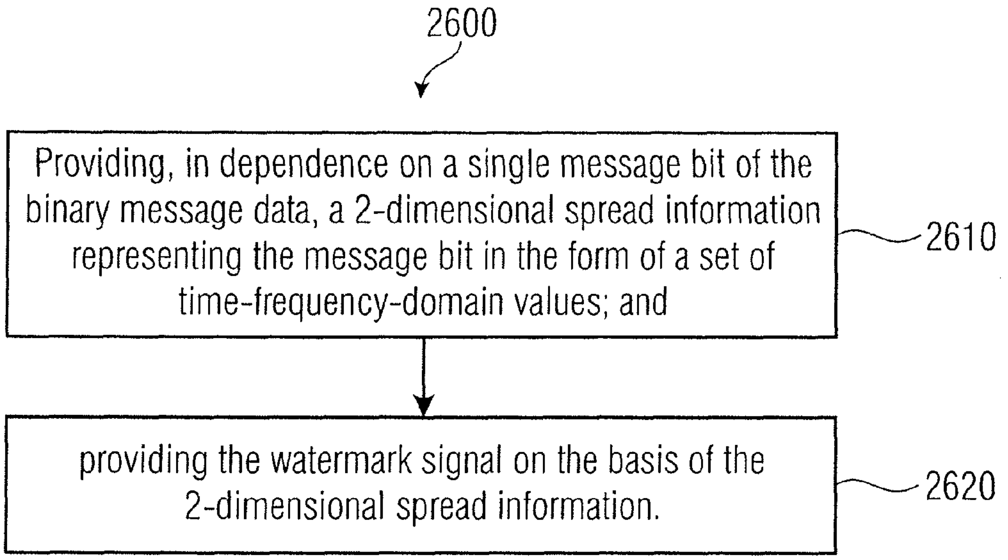
FIG. 26 shows a flowchart of a method for providing a watermark signal in dependence on binary message data.

1.2 Method for Providing a Watermark Signal in Dependence on Binary Message Data According to FIG. 26

In the following, a method for providing a watermark signal in dependence on binary message data will be explained taking reference to FIG. 26, which shows a flowchart of such a method.

The method 2600 of FIG. 26 comprises a step 2610 of providing, in dependence on a single message bit of the binary message data, a two-dimensional spread information representing the message bit in the form of a set of time-frequency-domain values. The method 2600 also comprises a step 2620 of providing the watermark signal on the basis of the two-dimensional spread information.

Naturally, the method 2600 can be supplemented by any of the features and functionalities discussed herein, also with respect to the inventive apparatus.

2. Watermark Decoding 2.1 Watermark Decoder According to FIG. 25*a*

Figure 25A:
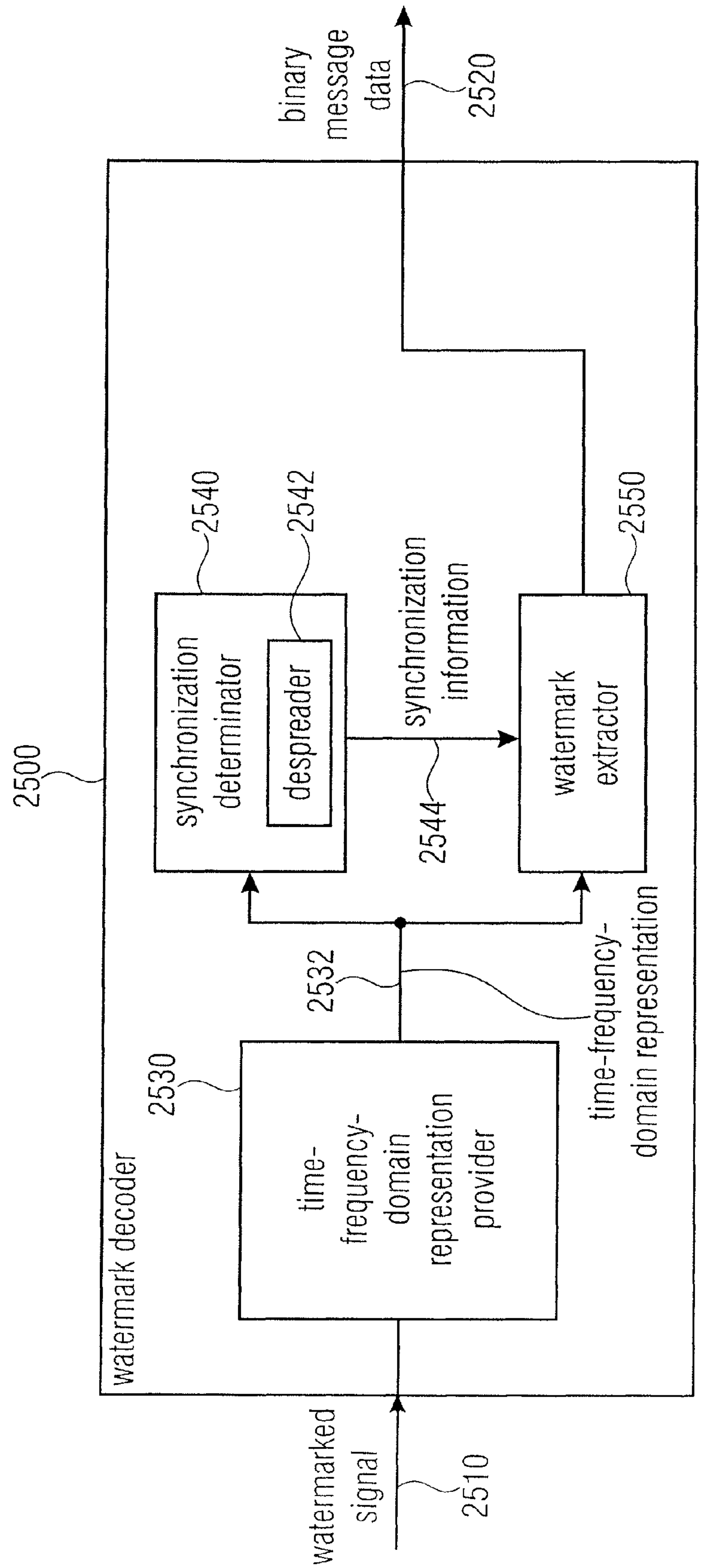
FIG. 25*a* shows a block-schematic diagram of a watermark decoder, according to an embodiment of the invention.

In the following, a watermark decoder 2500 will be described taking reference to FIG. 25*a*, which shows a block schematic diagram of such a watermark decoder.

The watermark decoder 2500 is configured to provide binary message data 2520 in dependence on a watermarked signal 2510. The watermark decoder 2500 comprises a time-frequency-domain representation provider 2530 configured to provide a time-frequency-domain representation 2532 of the watermarked signal. The watermark decoder 2500 also comprises a synchronization determinator 2540. The synchronization determinator 2540 comprises a despreader 2542 having one or more despreader blocks. The despreader 2542 is configured to perform a two-dimensional despreading in order to obtain a synchronization information 2544 in dependence on a two-dimensional portion of the time-frequency-domain representation 2532. The watermark decoder 2500 also comprises a watermark extractor 2550 configured to extract the binary message data 2520 from the time-frequency-domain representation 2532 of the watermarked signal using the synchronization information 2544.

Naturally, the watermark decoder 2500 may be supplemented by any of the means and functionalities discussed here with respect to the watermark decoding.

Figure 25B:
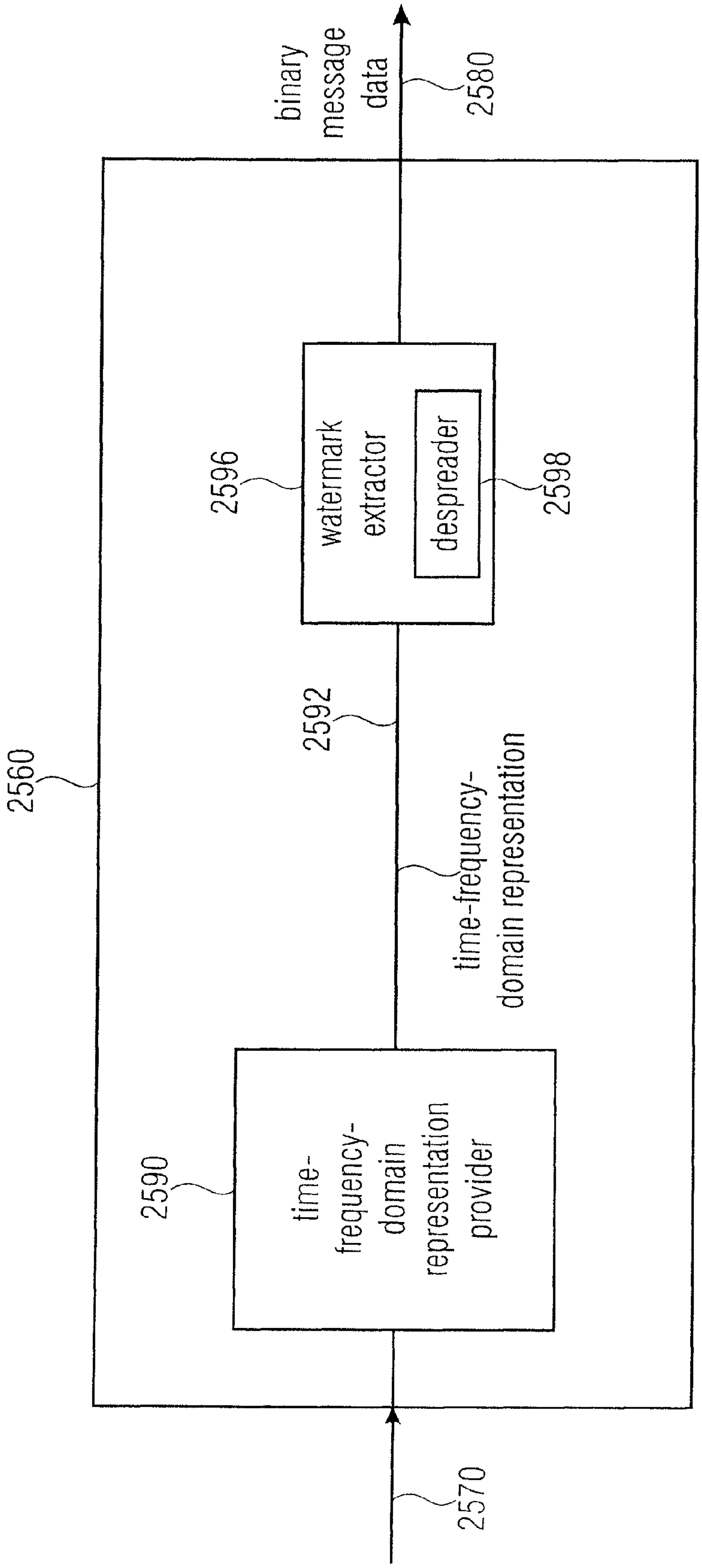
FIG. 25*b* shows a block-schematic diagram of a watermark decoder, according to an embodiment of the invention.

2.2 Watermark Decoder According to FIG. 25*b*

In the following, a watermark generator 2560 will be described taking reference to FIG. 25*b*, which shows a block schematic diagram of such a watermark generator.

The watermark generator 2560 is configured to receive a watermark signal 2570 and to provide, on the basis thereof, binary message data 2580. The watermark decoder 2560 comprises a time-frequency-domain representation provider 2590 configured to provide a time-frequency-domain representation 2592 of the watermark signal 2570. The watermark decoder also comprises a watermark extractor 2596 comprising a despreader 2598. The despreader is configured to perform a two-dimensional despreading in order to obtain a bit of the binary message data in dependence on a two-dimensional portion of the time-frequency-domain representation 2592.

Naturally, the watermark decoder 2560 can be supplemented by any of the means and functionalities discussed herein with respect to the watermark decoding.

Figure 27:
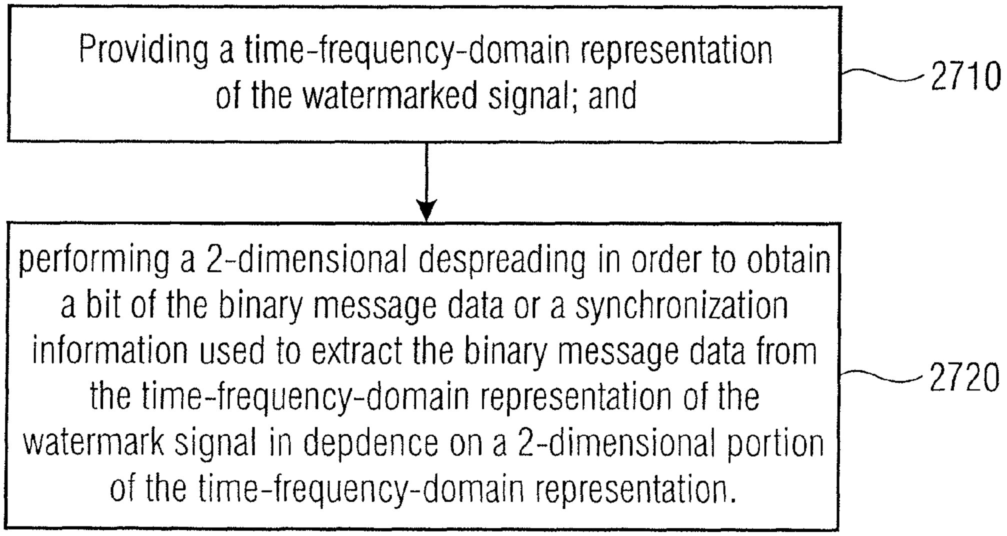
FIG. 27 shows a flowchart of a method for providing binary message data in dependence on a watermarked signal.

2.2 Method for Providing Binary Message Data in Dependence on a Watermarked Signal According to FIG. 27

In the following, a method 2700 for providing binary message data in dependence on a watermarked signal will be described taking reference to FIG. 27, which shows a flowchart of such a method.

The method 2700 comprises a step 2710 of providing a time-frequency-domain representation of the watermarked signal. The method 2700 also comprises a step 2720 of performing a two-dimensional despreading in order to obtain a bit of the binary message data or a synchronization information used to extract the binary message data from the time-frequency-domain representation of the watermarked signal in dependence on a two-dimensional portion of the time-frequency-domain representation.

Naturally, the method 2700 can be supplemented by any of the features and functionalities described herein with respect to the watermark decoding.

3. System Description

In the following, a system for a watermark transmission will be described, which comprises a watermark inserter and a watermark decoder. Naturally, the watermark inserter and the watermark decoder can be used independent from each other.

For the description of the system a top-down approach is chosen here. First, it is distinguished between encoder and decoder. Then, in sections 3.1 to 3.5 each processing block is described in detail.

Figure 1:
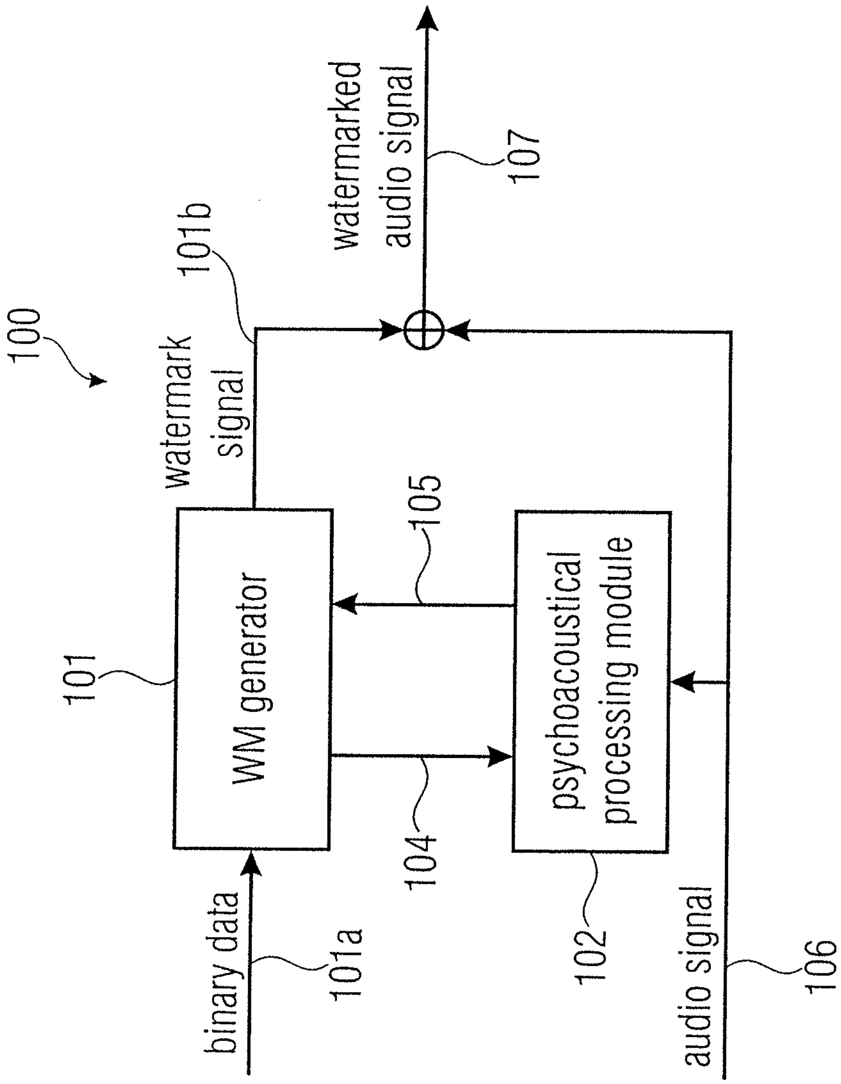
FIG. 1 shows a block schematic diagram of a watermark inserter according to an embodiment of the invention.
Figure 2:
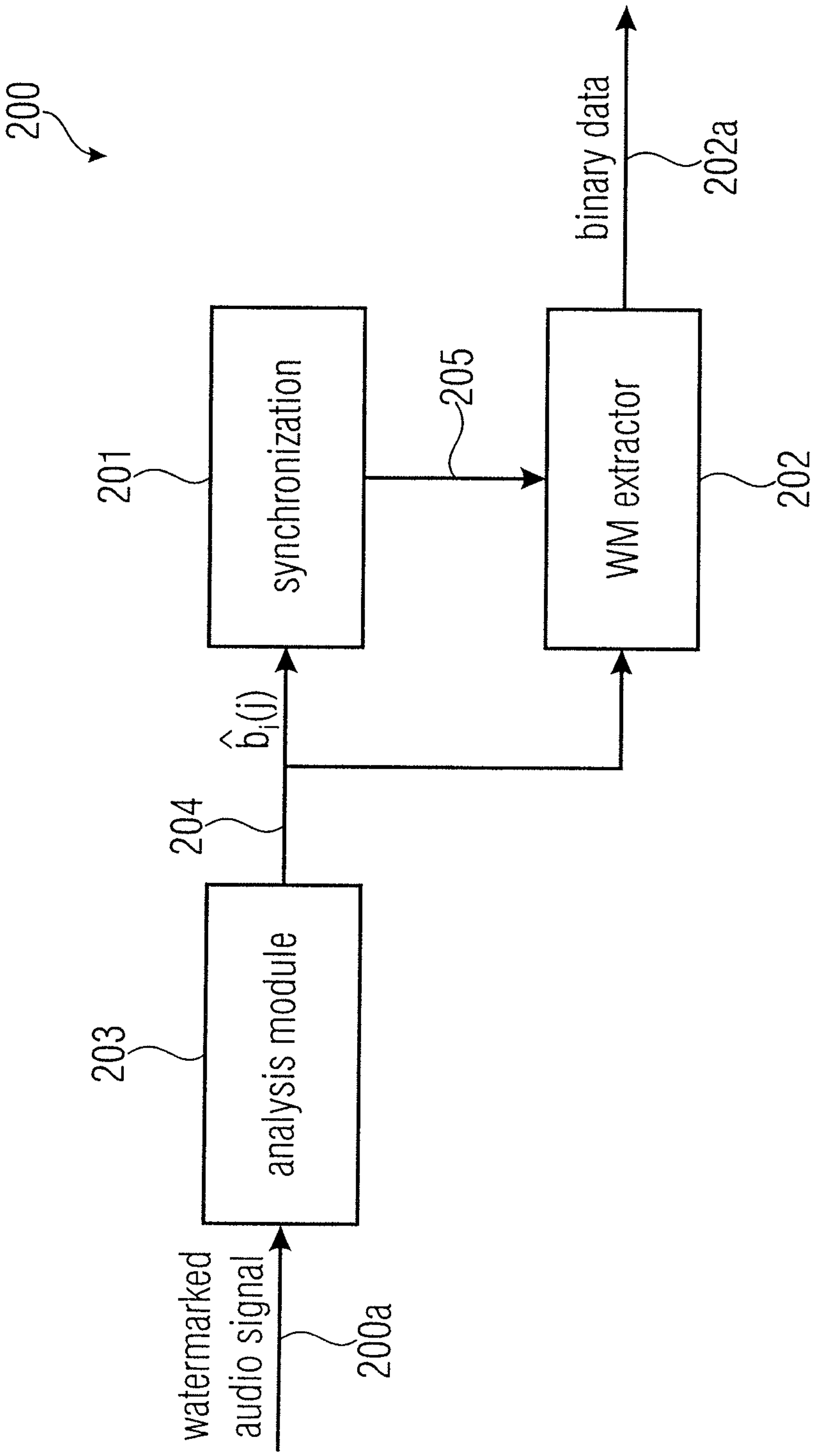
FIG. 2 shows a block-schematic diagram of a watermark decoder, according to an embodiment of the invention.

The basic structure of the system can be seen in FIGS. 1 and 2, which depict the encoder and decoder side, respectively. FIG. 1 shows a block schematic diagram of a watermark inserter 100. At the encoder side, the watermark signal 101*b* is generated in the processing block 101 (also designated as watermark generator) from binary data 101*a* and on the basis of information 104, 105 exchanged with the psychoacoustical processing module 102. The information provided from block 102 typically guarantees that the watermark is inaudible. The watermark generated by the watermark generator 101 is then added to the audio signal 106. The watermarked signal 107 can then be transmitted, stored, or further processed. In case of a multimedia file, e.g., an audio-video file, a proper delay needs to be added to the video stream not to lose audio-video synchronicity. In case of a multichannel audio signal, each channel is processed separately as explained in this document. The processing blocks 101 (watermark generator) and 102 (psychoacoustical processing module) are explained in detail in Sections 3.1 and 3.2, respectively.

The decoder side is depicted in FIG. 2, which shows a block schematic diagram of a watermark detector 200. A watermarked audio signal 200*a*, e.g., recorded by a microphone, is made available to the system 200. A first block 203, which is also designated as an analysis module, demodulates and transforms the data (e.g., the watermarked audio signal) in time/frequency domain (thereby obtaining a time-frequency-domain representation 204 of the watermarked audio signal 200*a*) passing it to the synchronization module 201, which analyzes the input signal 204 and carries out a temporal synchronization, namely, determines the temporal alignment of the encoded data (e.g. of the encoded watermark data relative to the time-frequency-domain representation). This information (e.g., the resulting synchronization information 205) is given to the watermark extractor 202, which decodes the data (and consequently provides the binary data 202*a*, which represent the data content of the watermarked audio signal 200*a*).

3.1 The Watermark Generator 101

Figure 3:
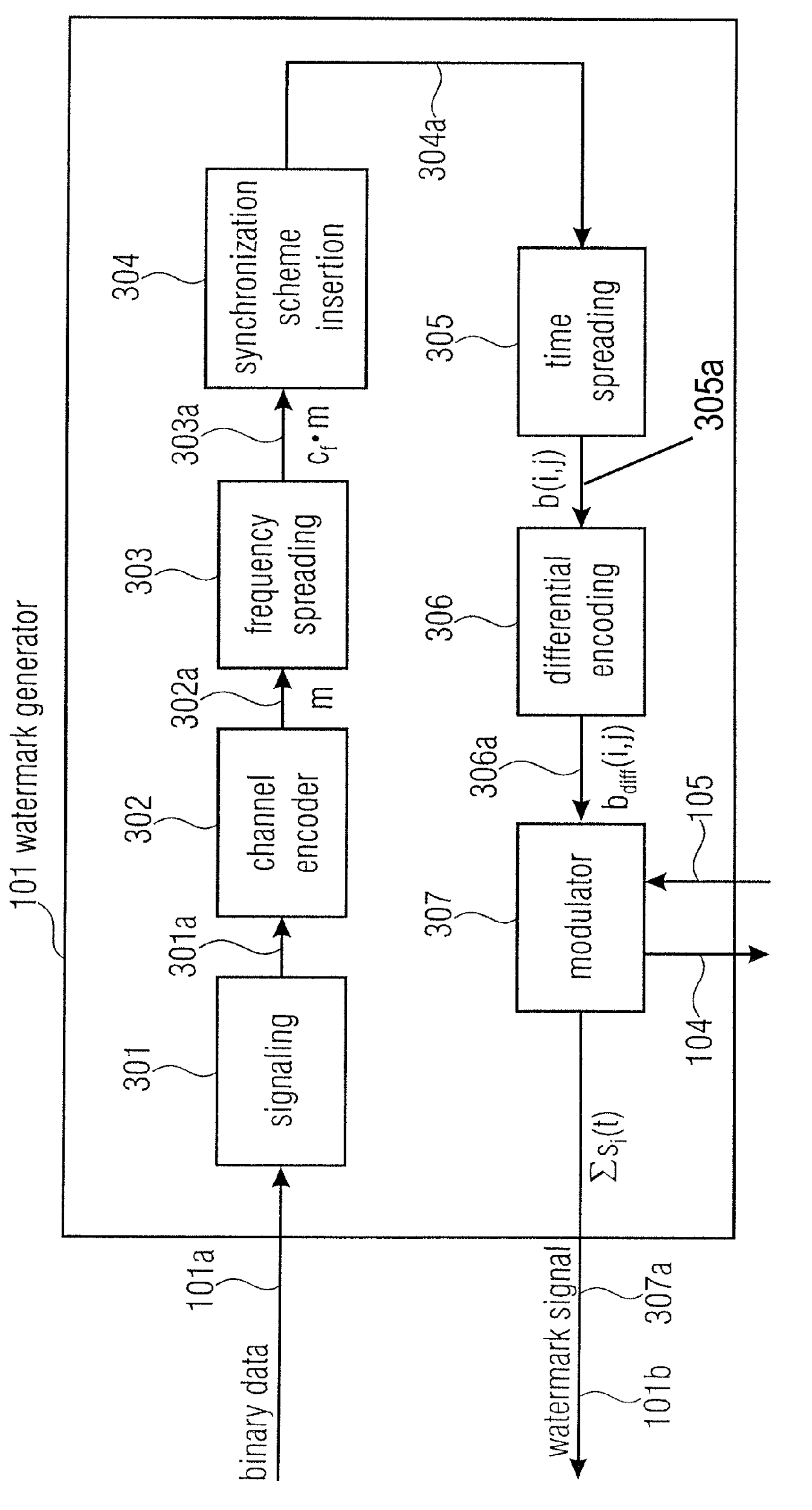
FIG. 3 shows a detailed block-schematic diagram of a watermark generator, according to an embodiment of the invention.

The watermark generator 101 is depicted detail in FIG. 3. Binary data (expressed as ±1) to be hidden in the audio signal 106 is given to the watermark generator 101. The block 301 organizes the data 101*a* in packets of equal length $M_p$. Overhead bits are added (e.g. appended) for signaling purposes to each packet. Let $M_s$ denote their number. Their use will be explained in detail in Section 3.5. Note that in the following each packet of payload bits together with the signaling overhead bits is denoted message.

Each message 301*a*, of length $N_m = M_s + M_p$, is handed over to the processing block 302, the channel encoder, which is responsible of coding the bits for protection against errors. A possible embodiment of this module consists of a convolutional encoder together with an interleaver. The ratio of the convolutional encoder influences greatly the overall degree of protection against errors of the watermarking system. The interleaver, on the other hand, brings protection against noise bursts. The range of operation of the interleaver can be limited to one message but it could also be extended to more messages. Let $R_c$ denote the code ratio, e.g., ¼. The number of coded bits for each message is $N_m/R_c$. The channel encoder provides, for example, an encoded binary message 302*a*.

The next processing block, 303, carries out a spreading in frequency domain. In order to achieve sufficient signal to noise ratio, the information (e.g. the information of the binary message 302*a*) is spread and transmitted in $N_f$ carefully chosen subbands. Their exact position in frequency is decided a priori and is known to both the encoder and the decoder. Details on the choice of this important system parameter is given in Section 3.2.2. The spreading in frequency is determined by the spreading sequence $c_f$ of size $N_f \times 1$. The output 303*a* of the block 303 consists of $N_f$ bit streams, one for each subband. The i-th bit stream is obtained by multiplying the input bit with the i-th component of spreading sequence $c_f$. The simplest spreading consists of copying the bit stream to each output stream, namely use a spreading sequence of all ones.

Block 304, which is also designated as a synchronization scheme inserter, adds a synchronization signal to the bit stream. A robust synchronization is important as the decoder does not know the temporal alignment of neither bits nor the data structure, i.e., when each message starts. The synchronization signal consists of $N_s$ sequences of $N_f$ bits each. The sequences are multiplied element wise and periodically to the bit stream (or bit streams 303*a*). For instance, let a, b, and c, be the Ns=3 synchronization sequences (also designated as synchronization spreading sequences). Block 304 multiplies a to the first spread bit, b to the second spread bit, and c to the third spread bit. For the following bits the process is periodically iterated, namely, a to the fourth bit, b for the fifth bit and so on. Accordingly, a combined information-synchronization information 304*a* is obtained. The synchronization sequences (also designated as synchronization spread sequences) are carefully chosen to minimize the risk of a false synchronization. More details are given in Section 3.4. Also, it should be noted that a sequence a, b, c, . . . may be considered as a sequence of synchronization spread sequences.

Block 305 carries out a spreading in time domain. Each spread bit at the input, namely a vector of length $N_f$, is repeated in time domain $N_t$ times. Similarly to the spreading in frequency, we define a spreading sequence $c_t$ of size $N_t \times 1$. The i-th temporal repetition is multiplied with the i-th component of $c_t$.

The operations of blocks 302 to 305 can be put in mathematical terms as follows. Let m of size $1 \times N_m = R_c$ be a coded message, output of 302. The output 303*a* (which may be considered as a spread information representation R) of block 303 is $$c_f \cdot m \text{ of size } N_f \times N_m/R_c \tag{1}$$

the output 304*a* of block 304, which may be considered as a combined information-synchronization representation C, is $$S \circ (c_f \cdot m) \text{ of size } N_f \times N_m/R_c \tag{2}$$

where $\circ$ denotes the Schur element-wise product and $$S = [\ldots a\ b\ c \ldots a\ b \ldots] \text{ of size } N_f \times N_m/R_c \tag{3}$$

The output 305*a* of 305 is $$(S \circ (c_f \cdot m)) \diamond c_t^T \text{ of size } N_f \times N_t \cdot N_m/R_c \tag{4}$$

where $\diamond$ and $^T$ denote the Kronecker product and transpose, respectively. Please recall that binary data is expressed as ±1.

Block 306 performs a differential encoding of the bits. This step gives the system additional robustness against phase shifts due to movement or local oscillator mismatches. More details on this matter are given in Section 3.3. If b(i; j) is the bit for the i-th frequency band and j-th time block at the input of block 306, the output bit $b_{diff}(i; j)$ is $$b_{diff}(i,j) = b_{diff}(i,j-1) \cdot b(i,j). \tag{5}$$

At the beginning of the stream, that is for j=0, $b_{diff}(i,j-1)$ is set to 1.

Figure 4:
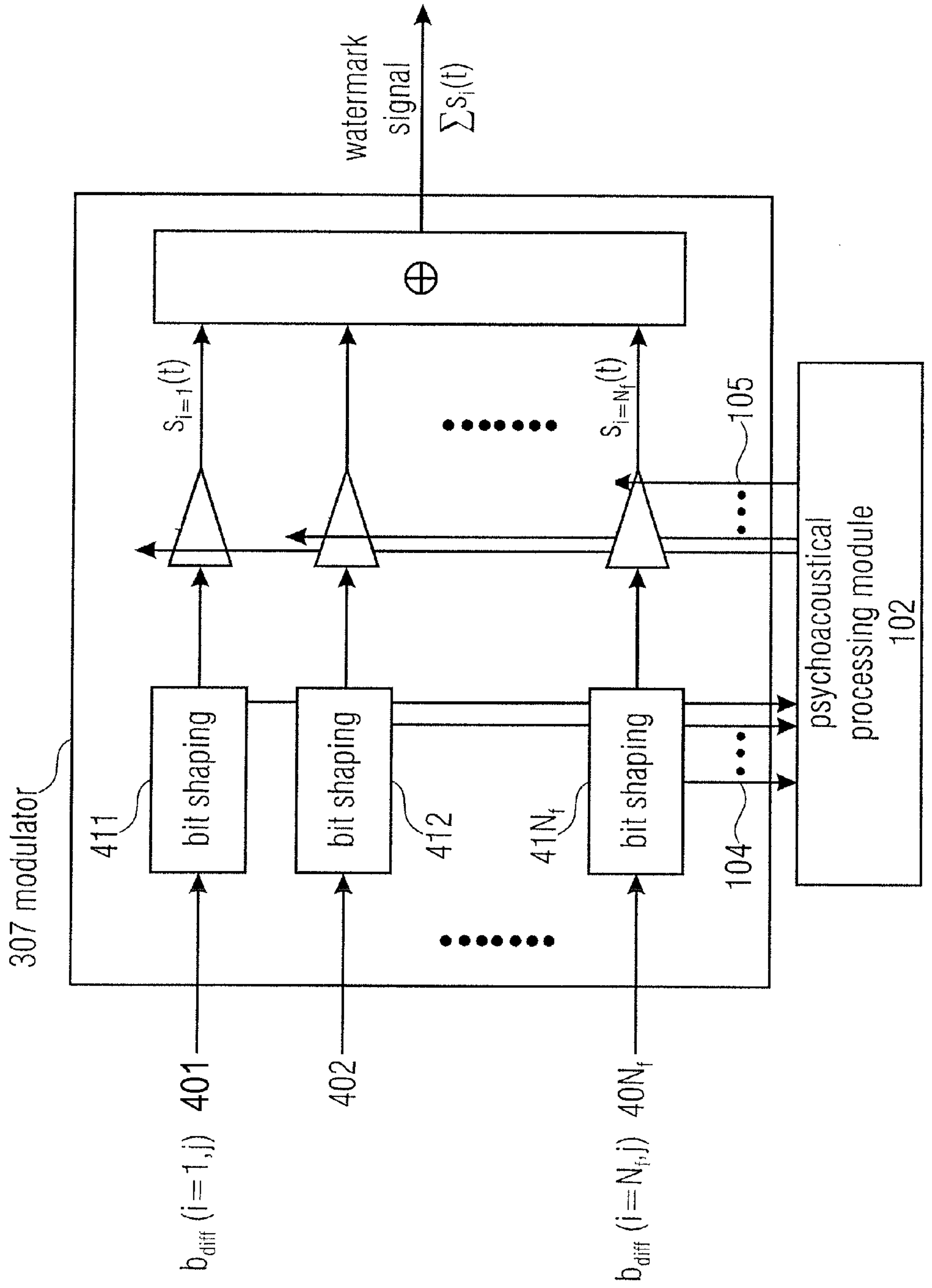
FIG. 4 shows a detailed block-schematic diagram of a modulator, for use in an embodiment of the invention.

Block 307 carries out the actual modulation, i.e., the generation of the watermark signal waveform depending on the binary information 306*a* given at its input. A more detailed schematics is given in FIG. 4. $N_f$ parallel inputs, 401 to 40$N_f$ contain the bit streams for the different subbands. Each bit of each subband stream is processed by a bit shaping block (411 to 41$N_f$). The output of the bit shaping blocks are waveforms in time domain. The waveform generated for the j-th time block and i-th subband, denoted by $s_{i,j}(t)$, on the basis of the input bit $b_{diff}(i, j)$ is computed as follows $$s_{i,j}(t) = b_{diff}(i,j)\gamma(i,j) \cdot g_i(t - j \cdot T_b), \tag{6}$$

where γ(i; j) is a weighting factor provided by the psychoacoustical processing unit 102, $T_b$ is the bit time interval, and $g_i(t)$ is the bit forming function for the i-th subband. The bit forming function is obtained from a baseband function $g_i^T(t)$ modulated in frequency with a cosine $$g_i(t) = g_i^T(t) \cdot \cos(2\pi f_i t) \tag{7}$$

where $f_i$ is the center frequency of the i-th subband and the superscript T stands for transmitter. The baseband functions can be different for each subband. If chosen identical, a more efficient implementation at the decoder is possible. See Section 3.3 for more details.

The bit shaping for each bit is repeated in an iterative process controlled by the psychoacoustical processing module (102). Iterations are necessitated to fine tune the weights γ(i, j) to assign as much energy as possible to the watermark while keeping it inaudible. More details are given in Section 3.2.

The complete waveform at the output of the i-th bit shaping filter 41*i* is $$s_i(t) = \sum_j s_{i,j}(t). \tag{8}$$

The bit forming baseband function $g_i^T(t)$ is normally non zero for a time interval much larger than $T_b$, although the main energy is concentrated within the bit interval. An example can be seen if FIG. 12*a* where the same bit forming baseband function is plotted for two adjacent bits. In the figure we have $T_b$=40 ms. The choice of $T_b$ as well as the shape of the function affect the system considerably. In fact, longer symbols provide narrower frequency responses. This is particularly beneficial in reverberant environments. In fact, in such scenarios the watermarked signal reaches the microphone via several propagation paths, each characterized by a different propagation time. The resulting channel exhibits strong frequency selectivity. Interpreted in time domain, longer symbols are beneficial as echoes with a delay comparable to the bit interval yield constructive interference, meaning that they increase the received signal energy. Notwithstanding, longer symbols bring also a few drawbacks; larger overlaps might lead to intersymbol interference (ISI) and are for sure more difficult to hide in the audio signal, so that the psychoacoustical processing module would allow less energy than for shorter symbols.

The watermark signal is obtained by summing all outputs of the bit shaping filters $$\sum_i s_i(t). \tag{9}$$

3.2 The Psychoacoustical Processing Module 102

Figure 5:
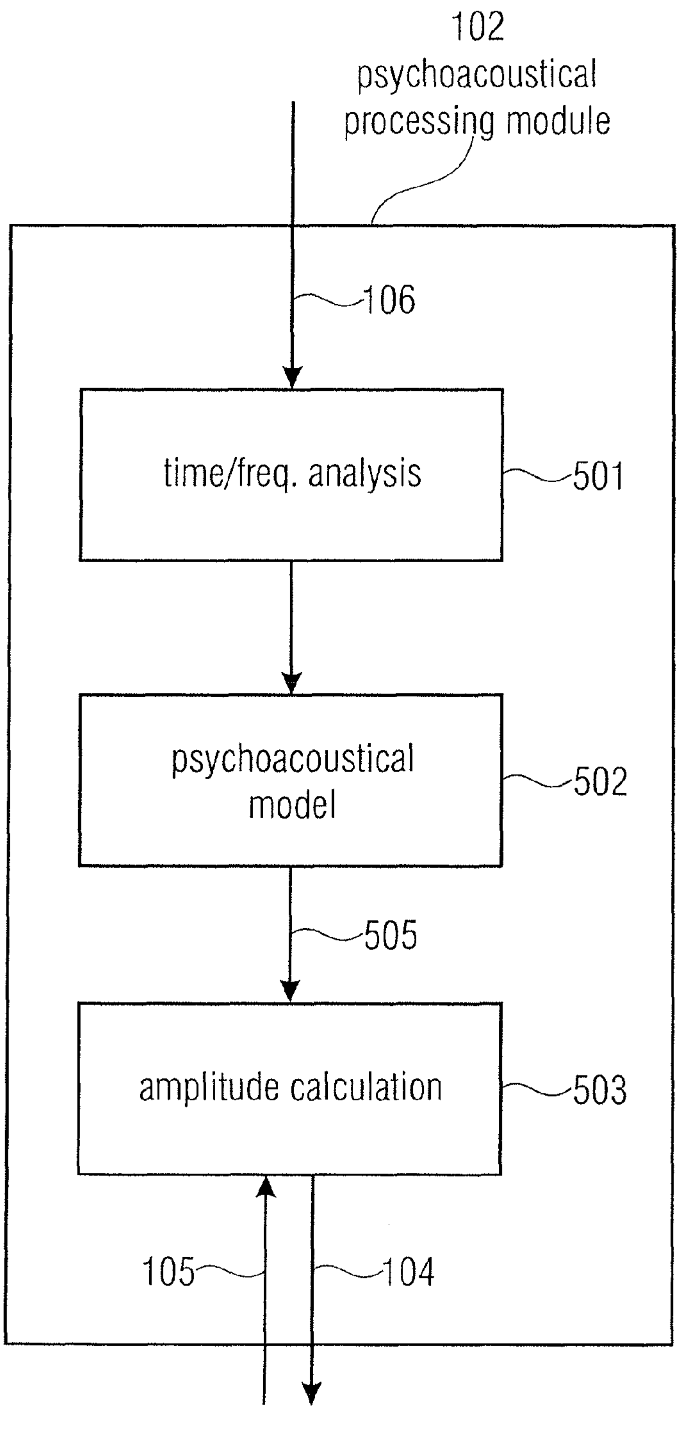
FIG. 5 shows a detailed block-schematic diagram of a psychoacoustical processing module, for use in an embodiment of the invention.
Figure 6:
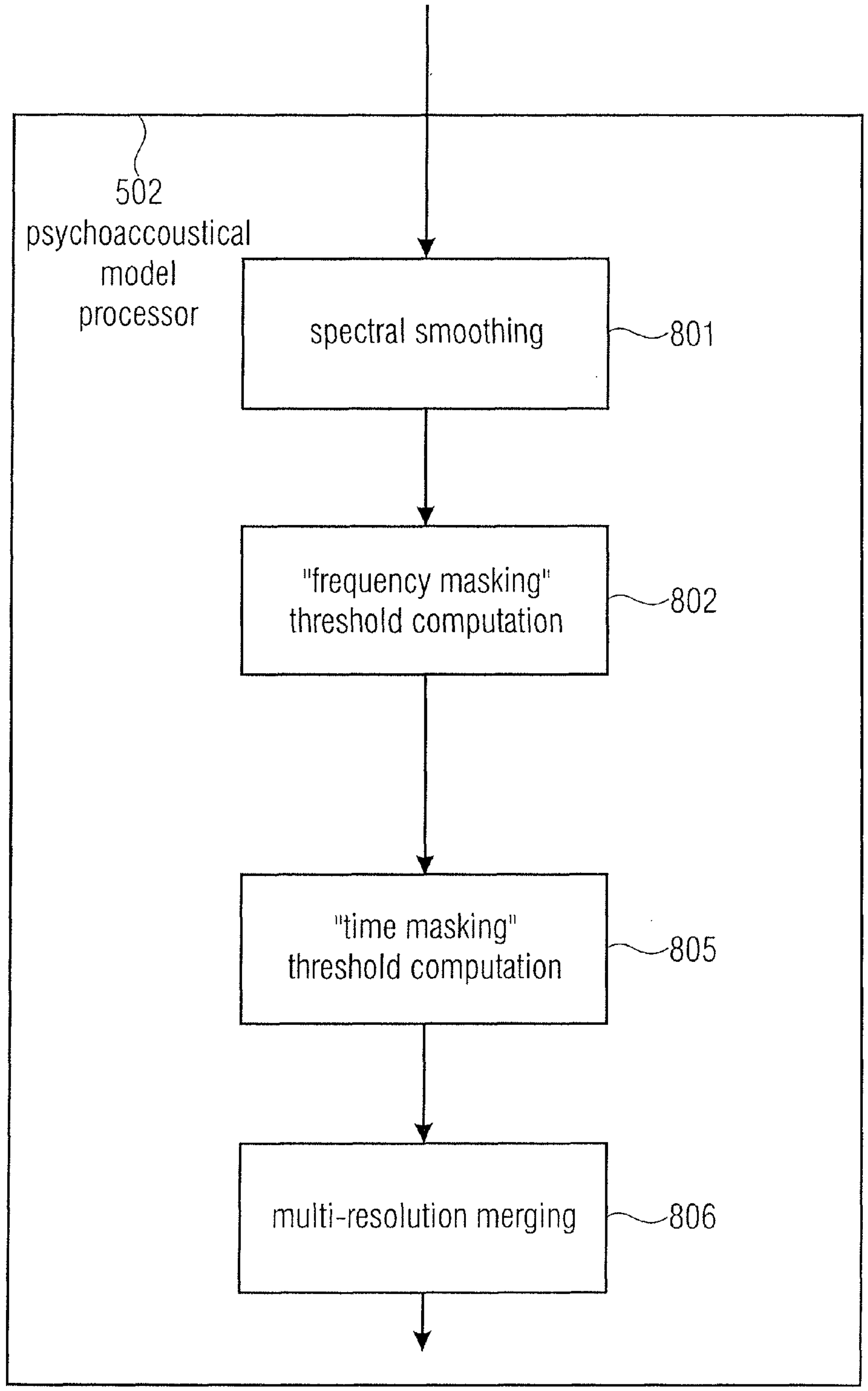
FIG. 6 shows a block-schematic diagram of a psychoacoustical model processor, for use in an embodiment of the invention.

As depicted in FIG. 5, the psychoacoustical processing module 102 consists of 3 parts. The first step is an analysis module 501 which transforms the time audio signal into the time/frequency domain. This analysis module may carry out parallel analyses in different time/frequency resolutions. After the analysis module, the time/frequency data is transferred to the psychoacoustic model (PAM) 502, in which masking thresholds for the watermark signal are calculated according to psychoacoustical considerations (see E. Zwicker H. Fastl, "Psychoacoustics Facts and models"). The masking thresholds indicate the amount of energy which can be hidden in the audio signal for each subband and time block. The last block in the psychoacoustical processing module 102 depicts the amplitude calculation module 503. This module determines the amplitude gains to be used in the generation of the watermark signal so that the masking thresholds are satisfied, i.e., the embedded energy is less or equal to the energy defined by the masking thresholds.

3.2.1 The Time/Frequency Analysis 501

Block 501 carries out the time/frequency transformation of the audio signal by means of a lapped transform. The best audio quality can be achieved when multiple time/frequency resolutions are performed. One efficient embodiment of a lapped transform is the short time Fourier transform (STFT), which is based on fast Fourier transforms (FFT) of windowed time blocks. The length of the window determines the time/frequency resolution, so that longer windows yield lower time and higher frequency resolutions, while shorter windows vice versa. The shape of the window, on the other hand, among other things, determines the frequency leakage.

For the proposed system, we achieve an inaudible watermark by analyzing the data with two different resolutions. A first filter bank is characterized by a hop size of $T_b$, i.e., the bit length. The hop size is the time interval between two adjacent time blocks. The window length is approximately $T_b$. Please note that the window shape does not have to be the same as the one used for the bit shaping, and in general should model the human hearing system. Numerous publications study this problem.

The second filter bank applies a shorter window. The higher temporal resolution achieved is particularly important when embedding a watermark in speech, as its temporal structure is in general finer than $T_b$.

The sampling rate of the input audio signal is not important, as long as it is large enough to describe the watermark signal without aliasing. For instance, if the largest frequency component contained in the watermark signal is 6 kHz, then the sampling rate of the time signals has to be at least 12 kHz.

3.2.2 The Psychoacoustical Model 502

The psychoacoustical model 502 has the task to determine the masking thresholds, i.e., the amount of energy which can be hidden in the audio signal for each subband and time block keeping the watermarked audio signal indistinguishable from the original.

The i-th subband is defined between two limits, namely $f_i^{(min)}$ and $f_i^{(max)}$. The subbands are determined by defining $N_f$ center frequencies $f_i$ and letting $f_{i-1}^{(max)}=f_i^{(min)}$i for i=2, 3, . . . , $N_f$. An appropriate choice for the center frequencies is given by the Bark scale proposed by Zwicker in 1961. The subbands become larger for higher center frequencies. A possible implementation of the system uses 9 subbands ranging from 1.5 to 6 kHz arranged in an appropriate way.

Figure 7:
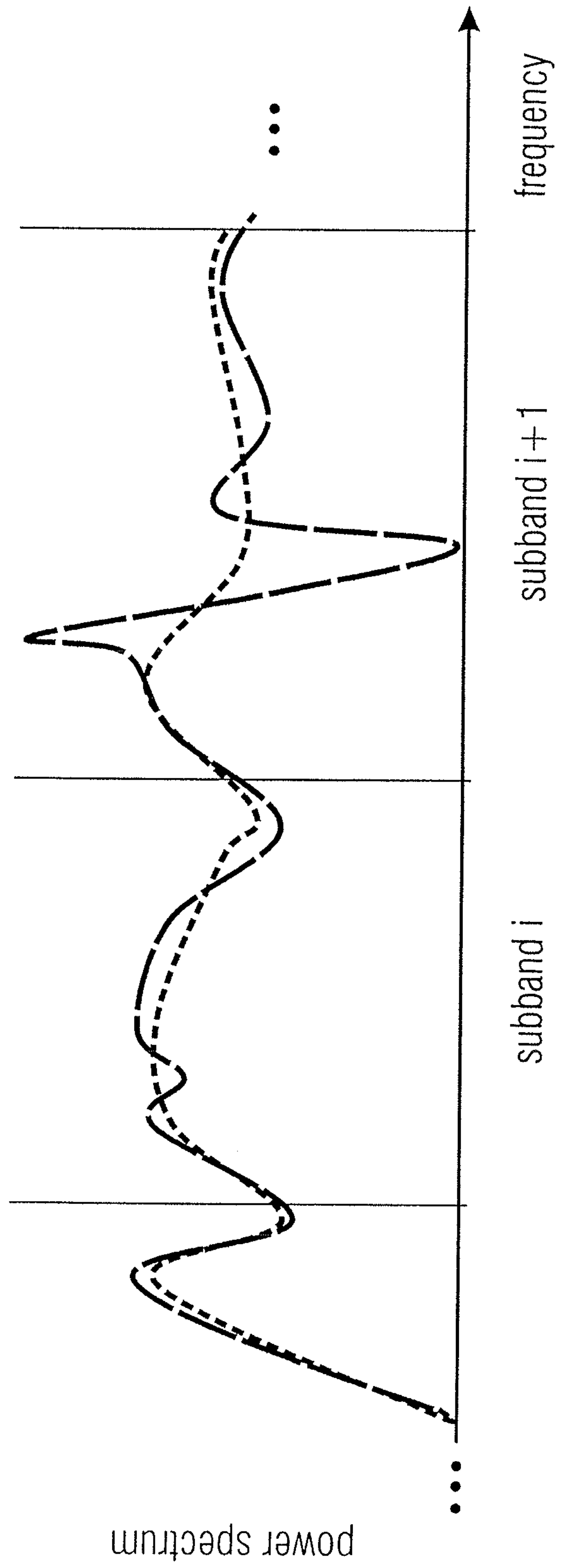
FIG. 7 shows a graphical representation of a power spectrum of an audio signal output by block 801 over frequency.

The following processing steps are carried out separately for each time/frequency resolution for each subband and each time block. The processing step 801 carries out a spectral smoothing. In fact, tonal elements, as well as notches in the power spectrum need to be smoothed. This can be carried out in several ways. A tonality measure may be computed and then used to drive an adaptive smoothing filter. Alternatively, in a simpler implementation of this block, a median-like filter can be used. The median filter considers a vector of values and outputs their median value. In a median-like filter the value corresponding to a different quantile than 50% can be chosen. The filter width is defined in Hz and is applied as a non-linear moving average which starts at the lower frequencies and ends up at the highest possible frequency. The operation of 801 is illustrated in FIG. 7. The red curve is the output of the smoothing.

Figure 8:
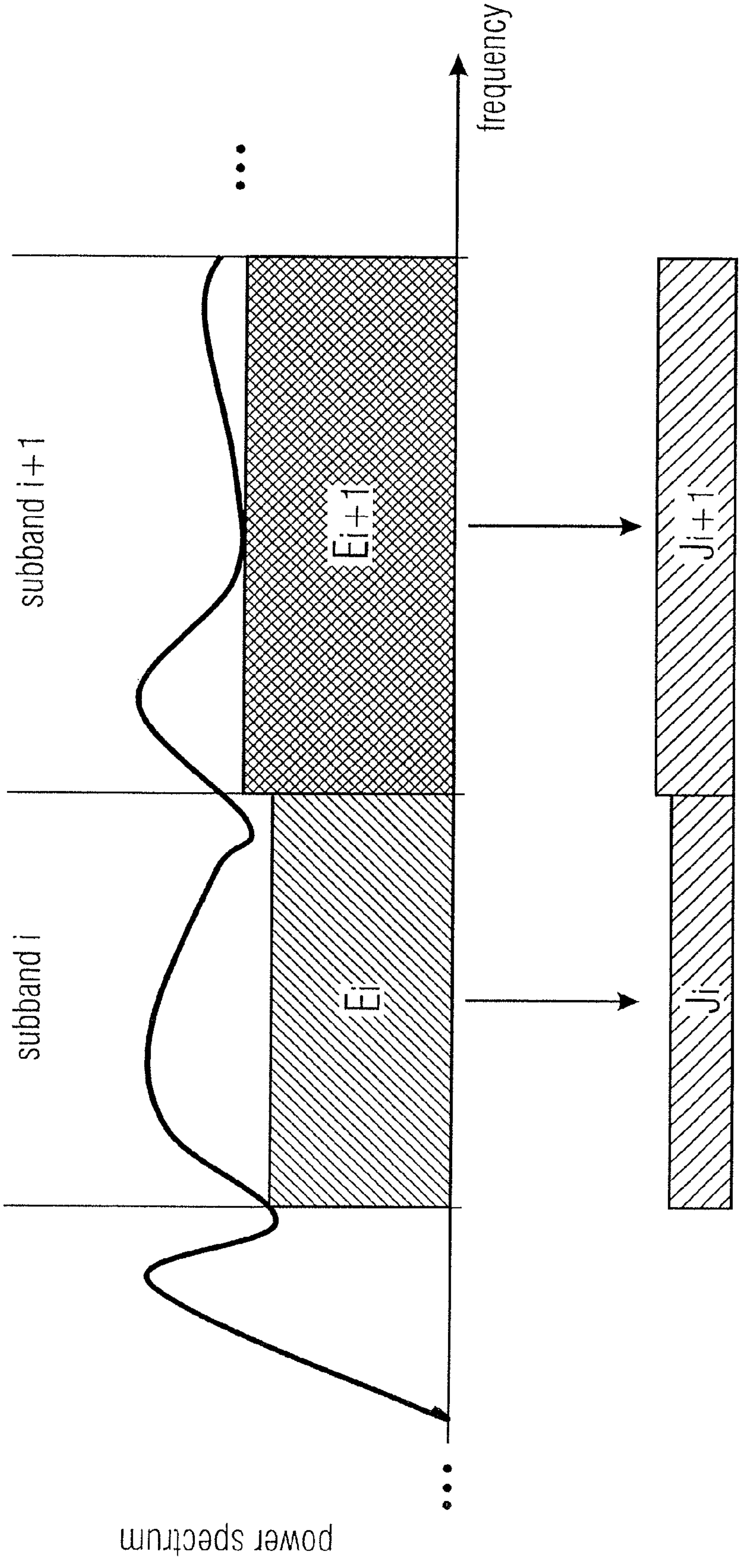
FIG. 8 shows a graphical representation of a power spectrum of an audio signal output by block 802 over frequency.

Once the smoothing has been carried out, the thresholds are computed by block 802 considering only frequency masking. Also in this case there are different possibilities. One way is to use the minimum for each subband to compute the masking energy $E_i$. This is the equivalent energy of the signal which effectively operates a masking. From this value we can simply multiply a certain scaling factor to obtain the masked energy $J_i$. These factors are different for each subband and time/frequency resolution and are obtained via empirical psychoacoustical experiments. These steps are illustrated in FIG. 8.

In block 805, temporal masking is considered. In this case, different time blocks for the same subband are analyzed. The masked energies $J_i$ are modified according to an empirically derived postmasking profile. Let us consider two adjacent time blocks, namely k−1 and k. The corresponding masked energies are $J_i(k-1)$ and $J_i(k)$. The postmasking profile defines that, e.g., the masking energy $E_i$ can mask an energy $J_i$ at time k and $\alpha \cdot J_i$ at time k+1. In this case, block 805 compares $J_i(k)$ (the energy masked by the current time block) and $\alpha \cdot J_i(k+1)$ (the energy masked by the previous time block) and chooses the maximum. Postmasking profiles are available in the literature and have been obtained via empirical psychoacoustical experiments. Note that for large $T_b$, i.e., >20 ms, postmasking is applied only to the time/frequency resolution with shorter time windows.

Summarizing, at the output of block 805 we have the masking thresholds per each subband and time block obtained for two different time/frequency resolutions. The thresholds have been obtained by considering both frequency and time masking phenomena. In block 806, the thresholds for the different time/frequency resolutions are merged. For instance, a possible implementation is that 806 considers all thresholds corresponding to the time and frequency intervals in which a bit is allocated, and chooses the minimum.

3.2.3 The Amplitude Calculation Block 503

Figure 9:
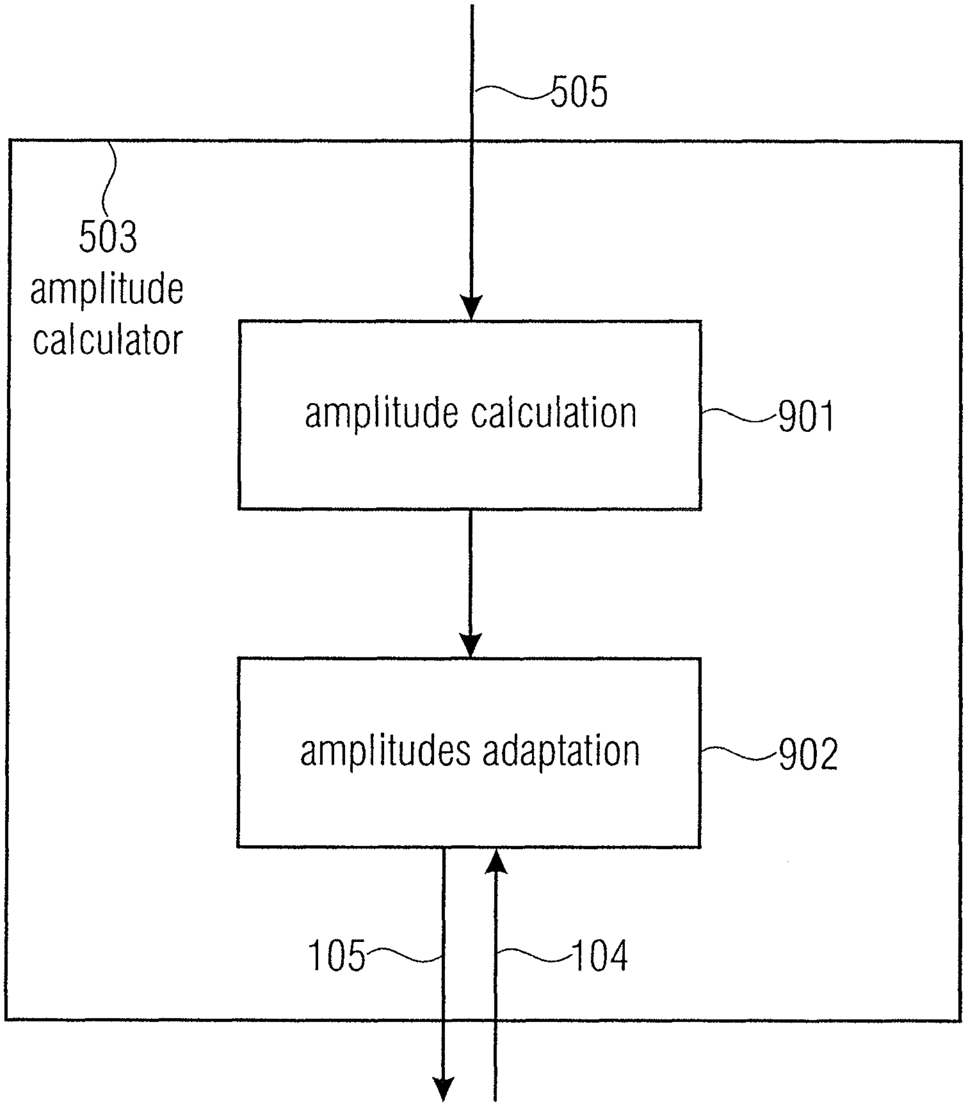
FIG. 9 shows a block-schematic diagram of an amplitude calculation.

Please refer to FIG. 9. The input of 503 are the thresholds 505 from the psychoacoustical model 502 where all psychoacoustics motivated calculations are carried out. In the amplitude calculator 503 additional computations with the thresholds are performed. First, an amplitude mapping 901 takes place. This block merely converts the masking thresholds (normally expressed as energies) into amplitudes which can be used to scale the bit shaping function defined in Section 3.1. Afterwards, the amplitude adaptation block 902 is run. This block iteratively adapts the amplitudes γ(i, j) which are used to multiply the bit shaping functions in the watermark generator 101 so that the masking thresholds are indeed fulfilled. In fact, as already discussed, the bit shaping function normally extends for a time interval larger than $T_b$. Therefore, multiplying the correct amplitude γ(i, j) which fulfills the masking threshold at point i, j does not necessarily fulfill the requirements at point i, j−1. This is particularly crucial at strong onsets, as a preecho becomes audible. Another situation which needs to be avoided is the unfortunate superposition of the tails of different bits which might lead to an audible watermark. Therefore, block 902 analyzes the signal generated by the watermark generator to check whether the thresholds have been fulfilled. If not, it modifies the amplitudes γ(i, j) accordingly.

This concludes the encoder side. The following sections deal with the processing steps carried out at the receiver (also designated as watermark decoder).

3.3 The Analysis Module 203

The analysis module 203 is the first step (or block) of the watermark extraction process. Its purpose is to transform the watermarked audio signal 200*a* back into $N_f$ bit streams $\hat{b}_i(j)$ (also designated with 204), one for each spectral subband i. These are further processed by the synchronization module 201 and the watermark extractor 202, as discussed in Sections 3.4 and 3.5, respectively. Note that the $\hat{b}_i(j)$ are soft bit streams, i.e., they can take, for example, any real value and no hard decision on the bit is made yet.

Figure 16:
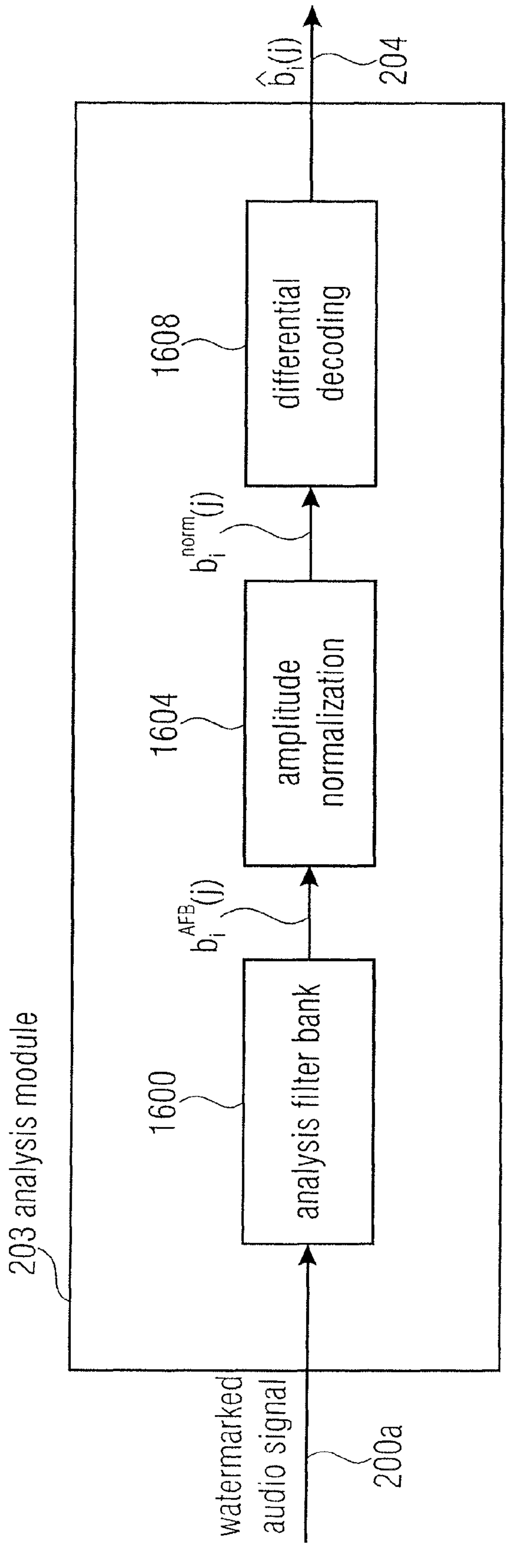
FIG. 16 shows a block-schematic diagram of an analysis module.
Figure 17A:
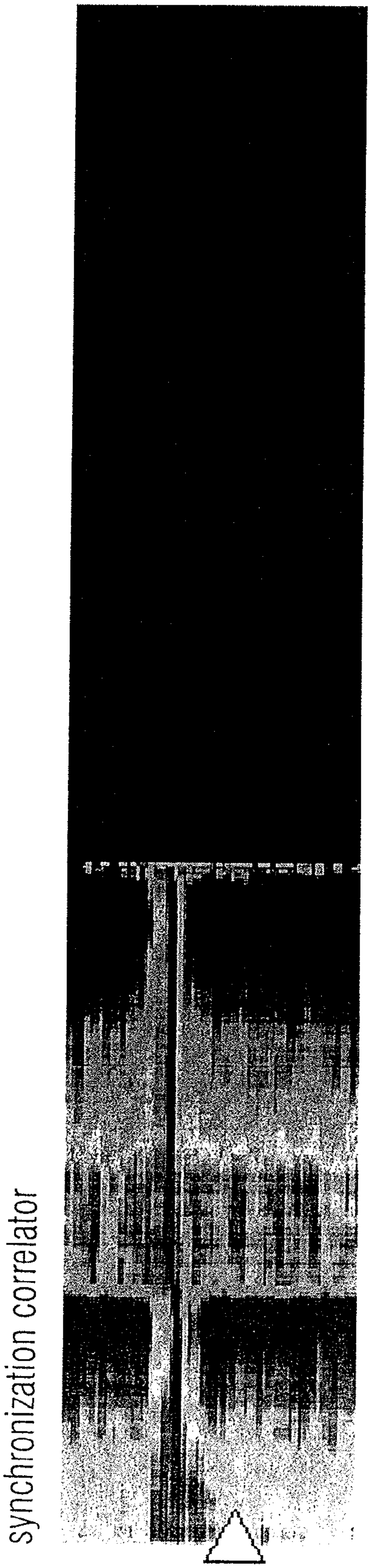
FIG. 17*a* shows a graphical representation of an output of a synchronization correlator.
Figure 17B:
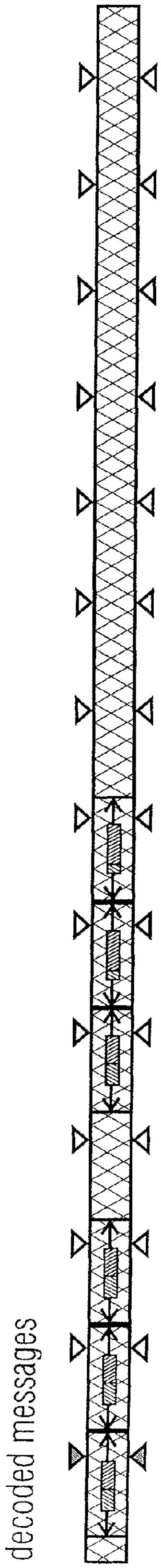
FIG. 17*b* shows a graphical representation of decoded messages.
Figure 17C:
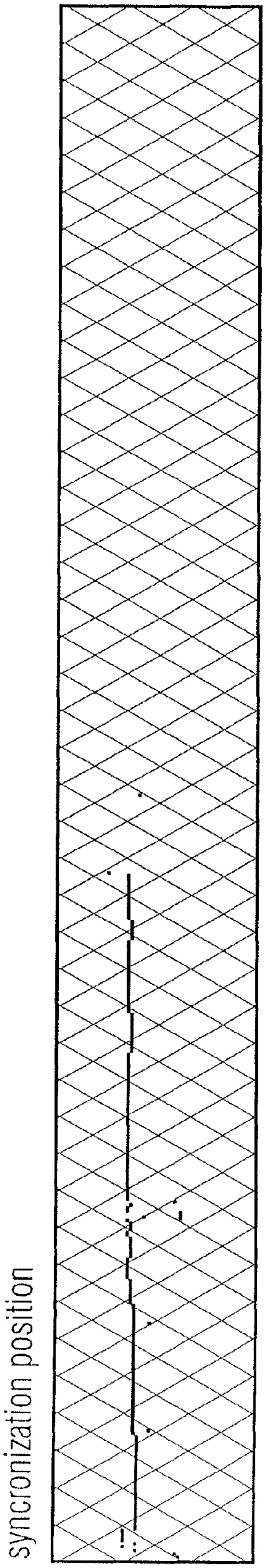
FIG. 17*c* shows a graphical representation of a synchronization position, which is extracted from a watermarked signal.

The analysis module consists of three parts which are depicted in FIG. 16: The analysis filter bank 1600, the amplitude normalization block 1604 and the differential decoding 1608.

3.3.1 Analysis Filter Bank 1600

Figure 10A:
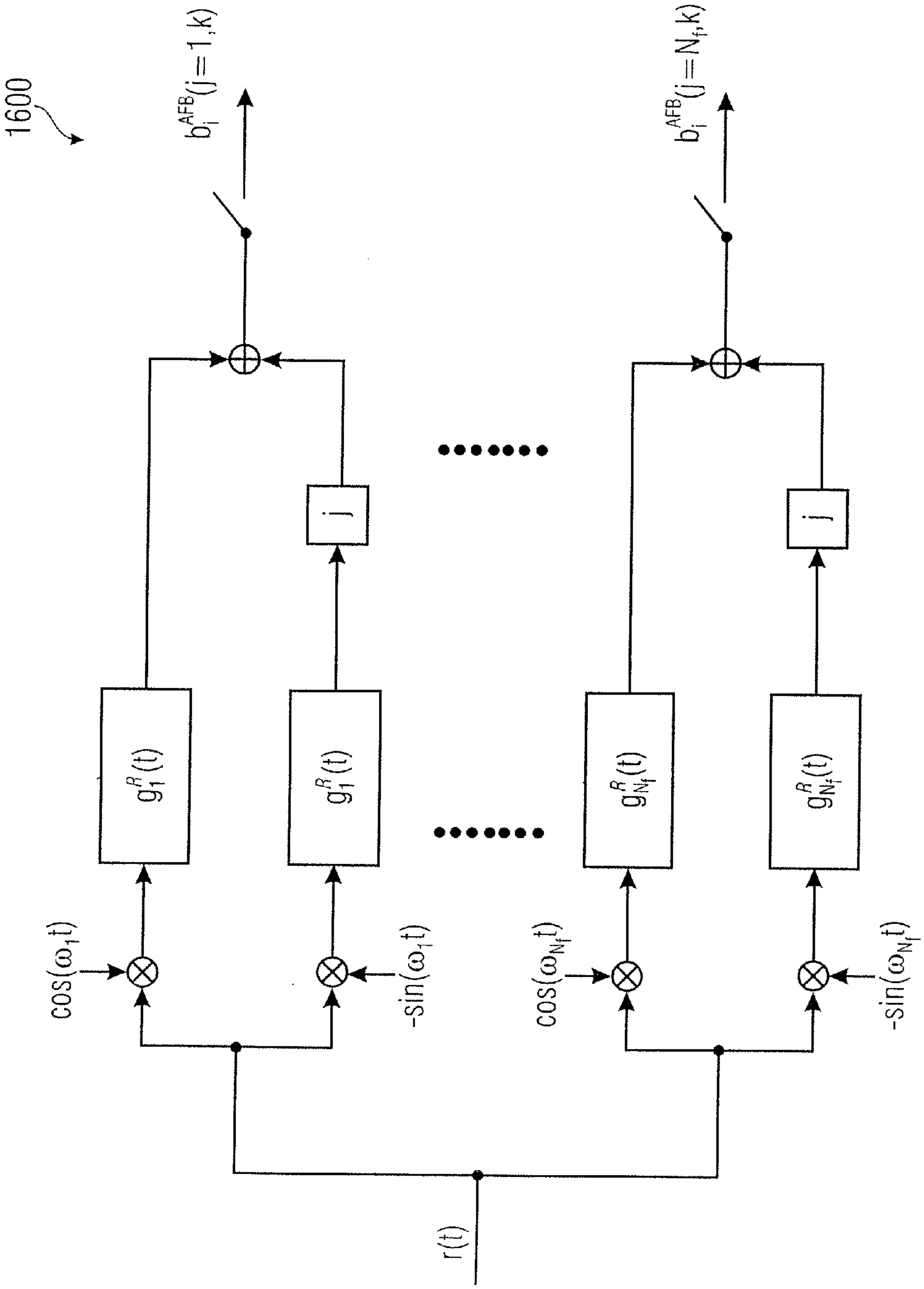
FIG. 10*a* shows a block schematic diagram of a modulator.

The watermarked audio signal is transformed into the time-frequency domain by the analysis filter bank 1600 which is shown in detail in FIG. 10*a*. The input of the filter bank is the received watermarked audio signal r(t). Its output are the complex coefficients $b_i^{AFB}(j)$ for the i-th branch or subband at time instant j. These values contain information about the amplitude and the phase of the signal at center frequency $f_i$ and time j·Tb.

The filter bank 1600 consists of $N_f$ branches, one for each spectral subband i. Each branch splits up into an upper subbranch for the in-phase component and a lower subbranch for the quadrature component of the subband i. Although the modulation at the watermark generator and thus the watermarked audio signal are purely real-valued, the complex-valued analysis of the signal at the receiver is needed because rotations of the modulation constellation introduced by the channel and by synchronization misalignments are not known at the receiver. In the following we consider the i-th branch of the filter bank. By combining the in-phase and the quadrature subbranch, we can define the complex-valued baseband signal $b_i^{AFB}(t)$ as $$b_i^{AFB}(t)=r(t)\cdot e^{-j2\pi f_i t} * g_i^R(t) \tag{10}$$

where * indicates convolution and $g_i^R(t)$ is the impulse response of the receiver lowpass filter of subband i. Usually $g_i^R(t)i(t)$ is equal to the baseband bit forming function $g_i^T(t)$ of subband i in the modulator 307 in order to fulfill the matched filter condition, but other impulse responses are possible as well.

In order to obtain the coefficients $b_i^{AFB}(j)$ with rate $1=T_b$, the continuous output $b_i^{AFB}(t)$ has to be sampled. If the correct timing of the bits was known by the receiver, sampling with rate $1=T_b$ would be sufficient. However, as the bit synchronization is not known yet, sampling is carried out with rate $N_{os}/T_b$ where $N_{os}$ is the analysis filter bank oversampling factor. By choosing $N_{os}$ sufficiently large (e.g. $N_{os}=4$), we can assure that at least one sampling cycle is close enough to the ideal bit synchronization. The decision on the best oversampling layer is made during the synchronization process, so all the oversampled data is kept until then. This process is described in detail in Section 3.4.

At the output of the i-th branch we have the coefficients $b_i^{AFB}(j, k)$, where j indicates the bit number or time instant and k indicates the oversampling position within this single bit, where k=1; 2; . . . , $N_{os}$.

Figure 10B:
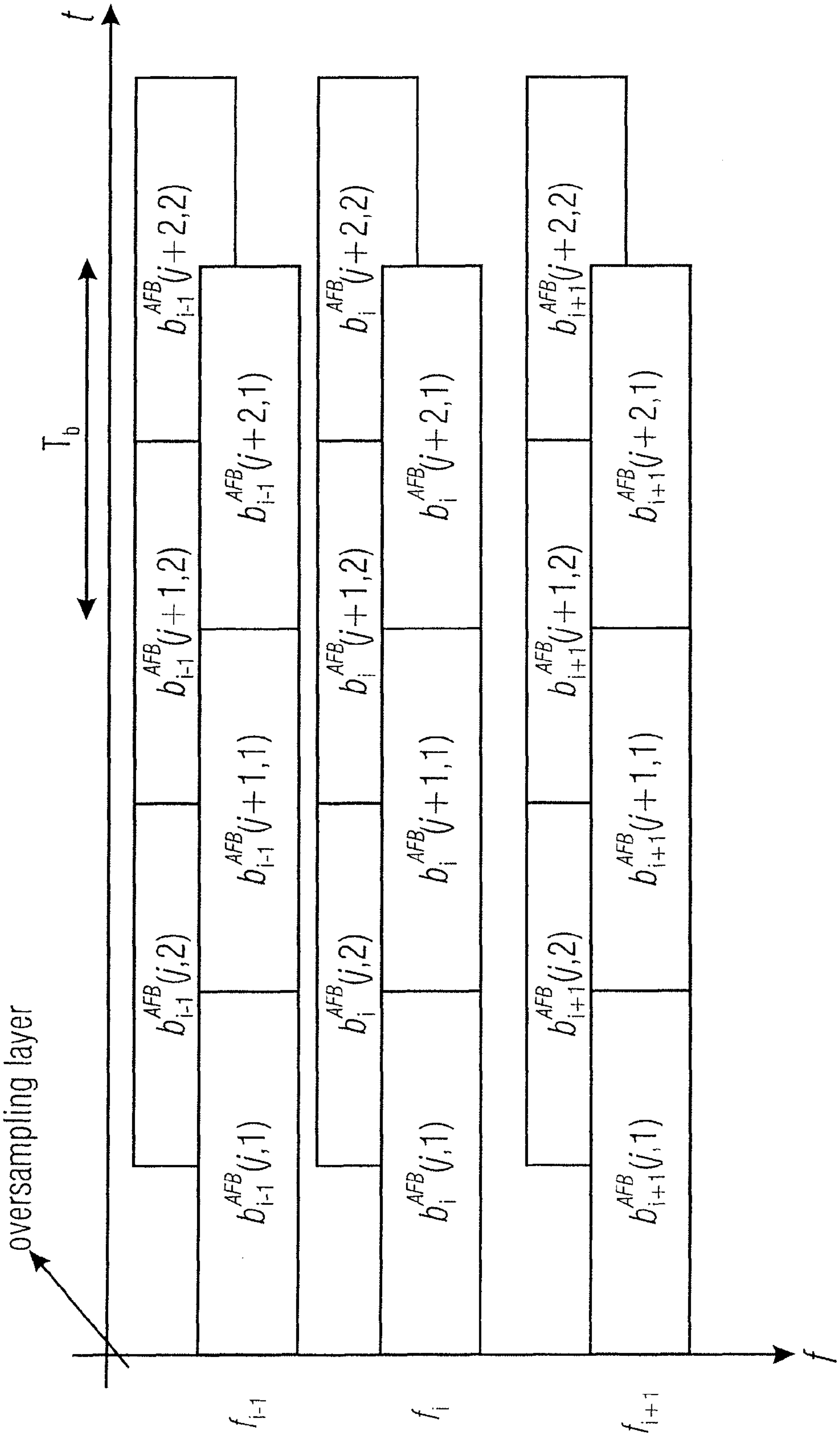
FIG. 10*b* shows a graphical representation of the location of coefficients on the time-frequency claim.

FIG. 10*b* gives an exemplary overview of the location of the coefficients on the time-frequency plane. The oversampling factor is $N_{os}=2$. The height and the width of the rectangles indicate respectively the bandwidth and the time interval of the part of the signal that is represented by the corresponding coefficient $b_i^{AFB}(j,k)$.

If the subband frequencies $f_i$ are chosen as multiples of a certain interval Δf the analysis filter bank can be efficiently implemented using the Fast Fourier Transform (FFT).

3.3.2 Amplitude Normalization 1604

Without loss of generality and to simplify the description, we assume that the bit synchronization is known and that $N_{os}=1$ in the following. That is, we have complex coefficients $b_i^{AFB}(j)$ at the input of the normalization block 1604. As no channel state information is available at the receiver (i.e., the propagation channel in unknown), an equal gain combining (EGC) scheme is used. Due to the time and frequency dispersive channel, the energy of the sent bit $b_i(j)$ is not only found around the center frequency $f_i$ and time instant j, but also at adjacent frequencies and time instants. Therefore, for a more precise weighting, additional coefficients at frequencies $f_i \pm n\,\Delta f$ are calculated and used for normalization of coefficient $b_i^{AFB}(j)$. If n=1 we have, for example, $$b_i^{norm}(j) = \frac{b_i^{AFB}(j)}{\sqrt{1/3\cdot\left(|b_i^{AFB}(j)|^2 + |b_{i-\Delta f}^{AFB}(j)|^2 + |b_{i+\Delta f}^{AFB}(j)|^2\right)}} \tag{11}$$

The normalization for n>1 is a straightforward extension of the formula above. In the same fashion we can also choose to normalize the soft bits by considering more than one time instant. The normalization is carried out for each subband i and each time instant j. The actual combining of the EGC is done at later steps of the extraction process.

3.3.3 Differential Decoding 1608

At the input of the differential decoding block 1608 we have amplitude normalized complex coefficients $b_i^{norm}(j)$ which contain information about the phase of the signal components at frequency $f_i$ and time instant j. As the bits are differentially encoded at the transmitter, the inverse operation has to be performed here. The soft bits $\hat{b}_i(j)$ are obtained by first calculating the difference in phase of two consecutive coefficients and then taking the real part:

$$\hat{b}_i(j)=Re\{b_i^{norm}(j)\cdot b_i^{norm*}(j-1)\} \quad (12)$$

$$=Re\{|b_i^{norm}(j)|\cdot|b_i^{norm}(j-1)|\cdot e^{j(\phi_j-\phi_{j-1})}\} \quad (13)$$

This has to be carried out separately for each subband because the channel normally introduces different phase rotations in each subband.

3.4 The Synchronization Module 201

Figure 12A:
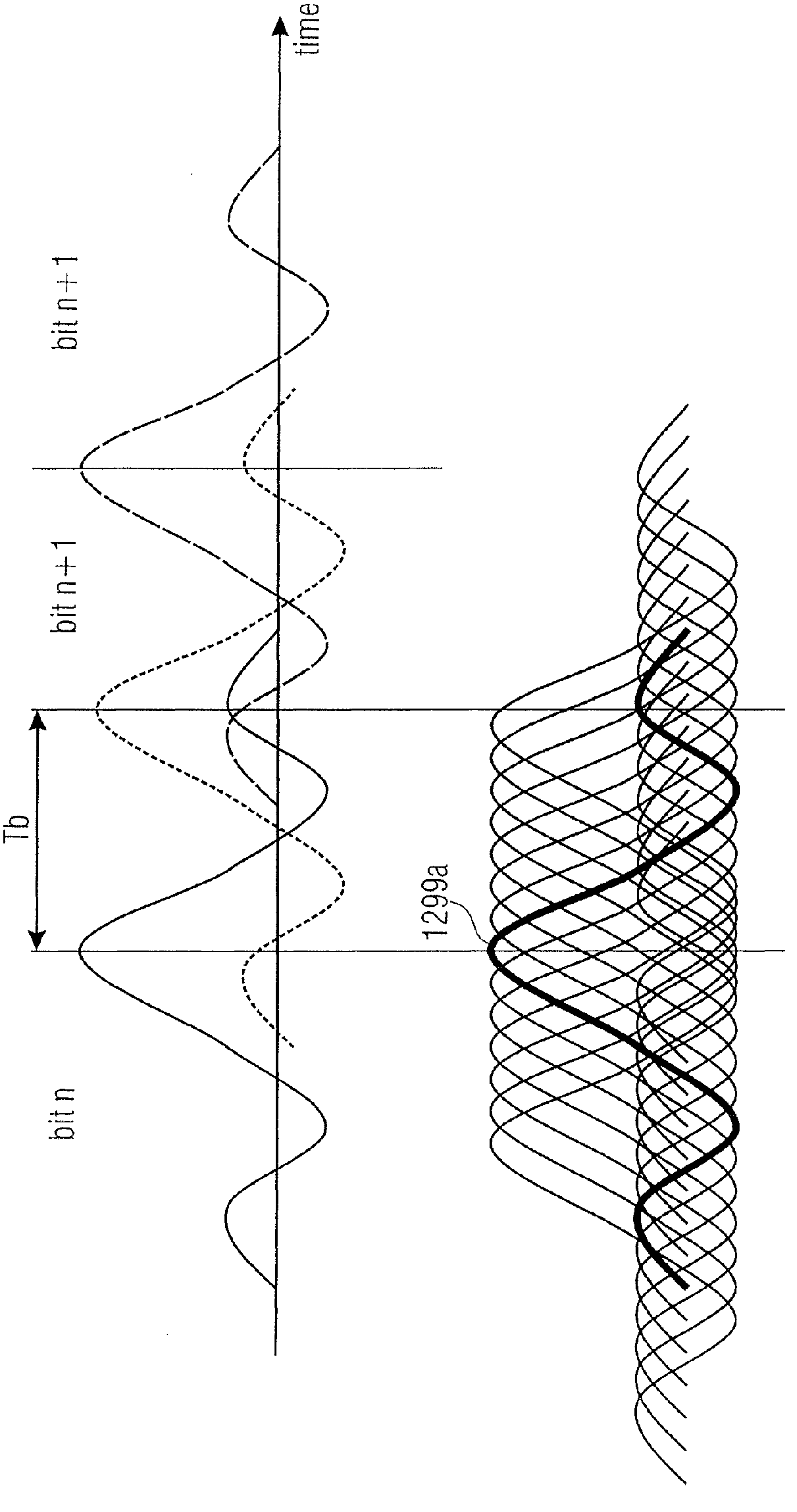
FIG. 12*a* shows a graphical representation of the problem of finding the temporal alignment of a watermark.
Figure 12B:
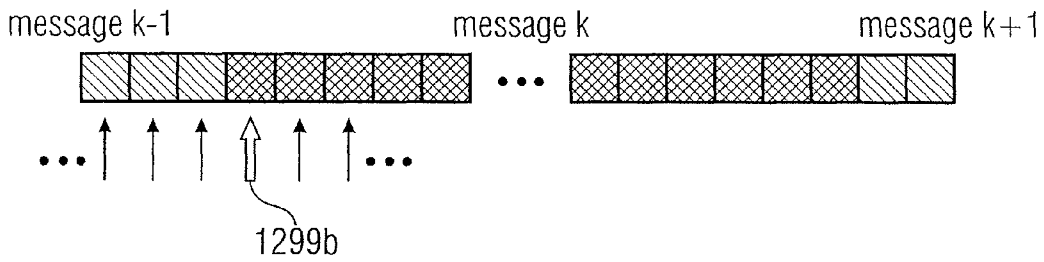
FIG. 12*b* shows a graphical representation of the problem of identifying the message start.

The synchronization module's task is to find the temporal alignment of the watermark. The problem of synchronizing the decoder to the encoded data is twofold. In a first step, the analysis filterbank has to be aligned with the encoded data, namely the bit shaping functions $g_i^T(t)$ used in the synthesis in the modulator has to be aligned with the filters $g_i^R(t)$ used for the analysis. This problem is illustrated in FIG. 12*a*, where the analysis filters are identical to the synthesis ones. At the top, three bits are visible. For simplicity, the waveforms for all three bits are not scaled. The temporal offset between different bits is $T_b$. The bottom part illustrates the synchronization issue at the decoder: the filter can be applied at different time instants, however, only the position marked in red (curve 1299*a*) is correct and allows to extract the first bit with the best signal to noise ratio SNR and signal to interference ratio SIR. In fact, an incorrect alignment would lead to a degradation of both SNR and SIR. We refer to this first alignment issue as "bit synchronization". Once the bit synchronization has been achieved, bits can be extracted optimally. However, to correctly decode a message, it is necessitated to know at which bit a new message starts. This issue is illustrated in FIG. 12*b* and is referred to as message synchronization. In the stream of decoded bits only the starting position marked in red (position 1299*b*) is correct and allows to decode the k-th message.

Figure 12C:
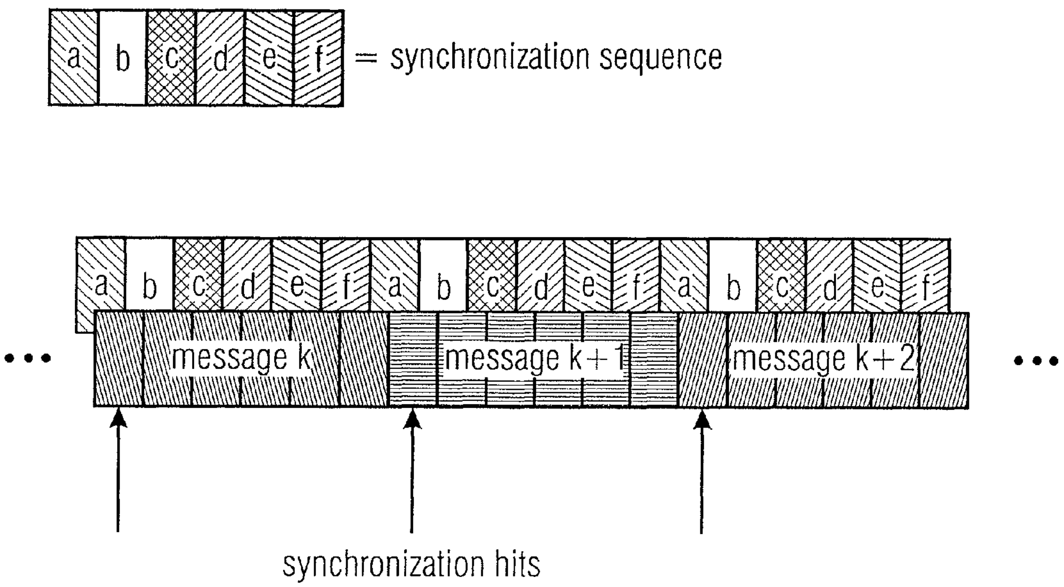
FIG. 12*c* shows a graphical representation of a temporal alignment of synchronization sequences in a full message synchronization mode.

We first address the message synchronization only. The synchronization signature, as explained in Section 3.1, is composed of Ns sequences in a predetermined order which are embedded continuously and periodically in the watermark. The synchronization module is capable of retrieving the temporal alignment of the synchronization sequences. Depending on the size $N_s$ we can distinguish between two modes of operation, which are depicted in FIGS. 12*c* and 12*d*, respectively.

In the full message synchronization mode (FIG. 12*c*) we have $N_s=N_m/R_c$. For simplicity in the figure we assume $N_s=N_m/R_c=6$ and no time spreading, i.e., $N_t=1$. The synchronization signature used, for illustration purposes, is shown beneath the messages. In reality, they are modulated depending on the coded bits and frequency spreading sequences, as explained in Section 3.1. In this mode, the periodicity of the synchronization signature is identical to the one of the messages. The synchronization module therefore can identify the beginning of each message by finding the temporal alignment of the synchronization signature. We refer to the temporal positions at which a new synchronization signature starts as synchronization hits. The synchronization hits are then passed to the watermark extractor 202.

Figure 12D:
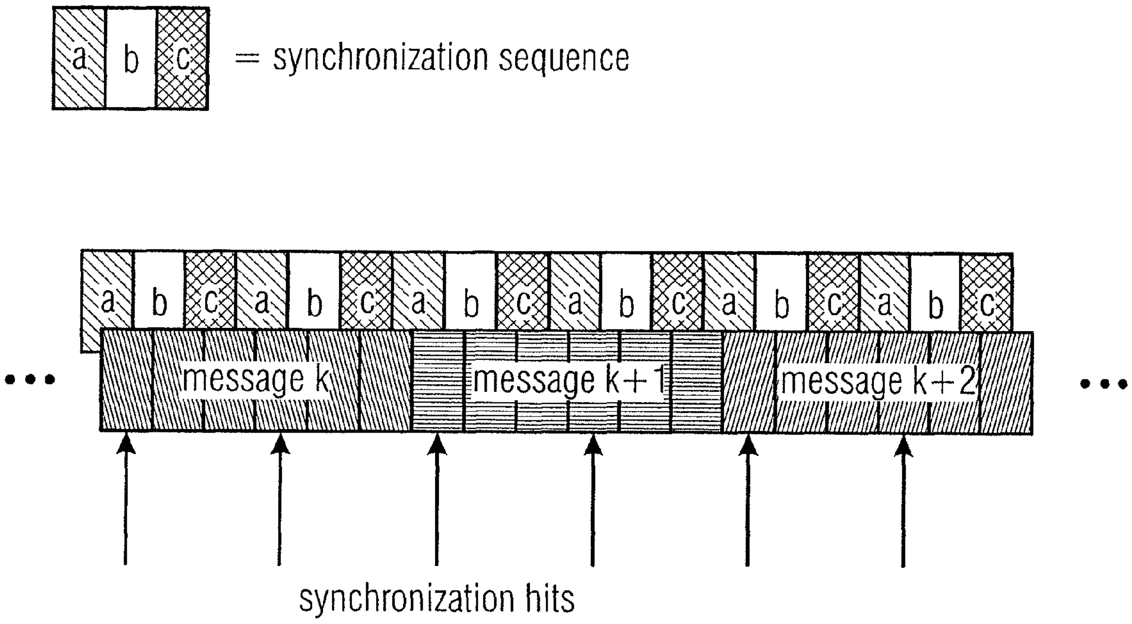
FIG. 12*d* shows a graphical representation of the temporal alignment of the synchronization sequences in a partial message synchronization mode.

The second possible mode, the partial message synchronization mode (FIG. 12*d*), is depicted in FIG. 12*d*. In this case we have $N_s<N_m=R_c$. In the figure we have taken $N_s=3$, so that the three synchronization sequences are repeated twice for each message. Please note that the periodicity of the messages does not have to be multiple of the periodicity of the synchronization signature. In this mode of operation, not all synchronization hits correspond to the beginning of a message. The synchronization module has no means of distinguishing between hits and this task is given to the watermark extractor 202.

Figure 11A:
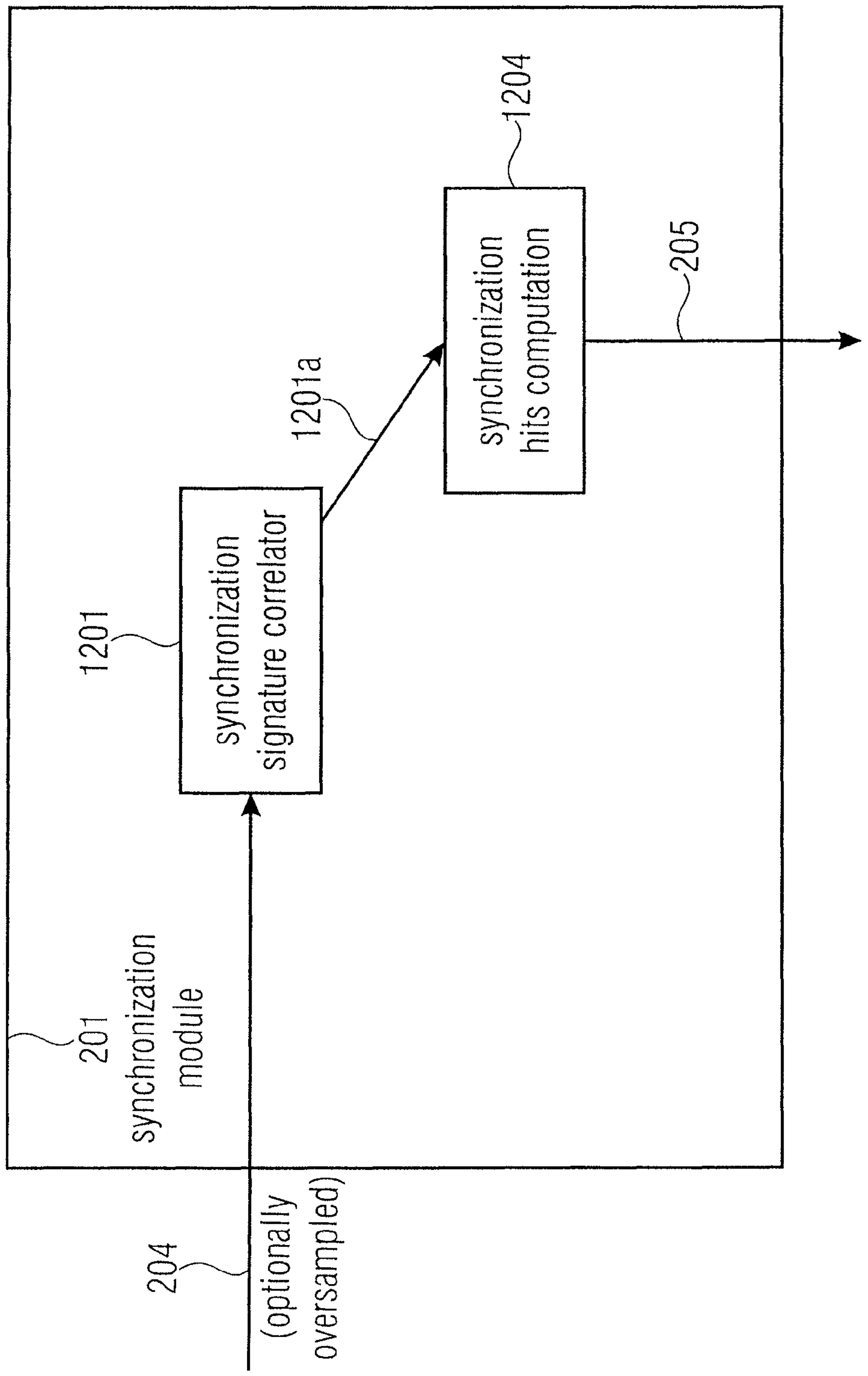
FIGS. 11*a* and 11*b* show a block-schematic diagrams of implementation alternatives of the synchronization module.
Figure 11B:
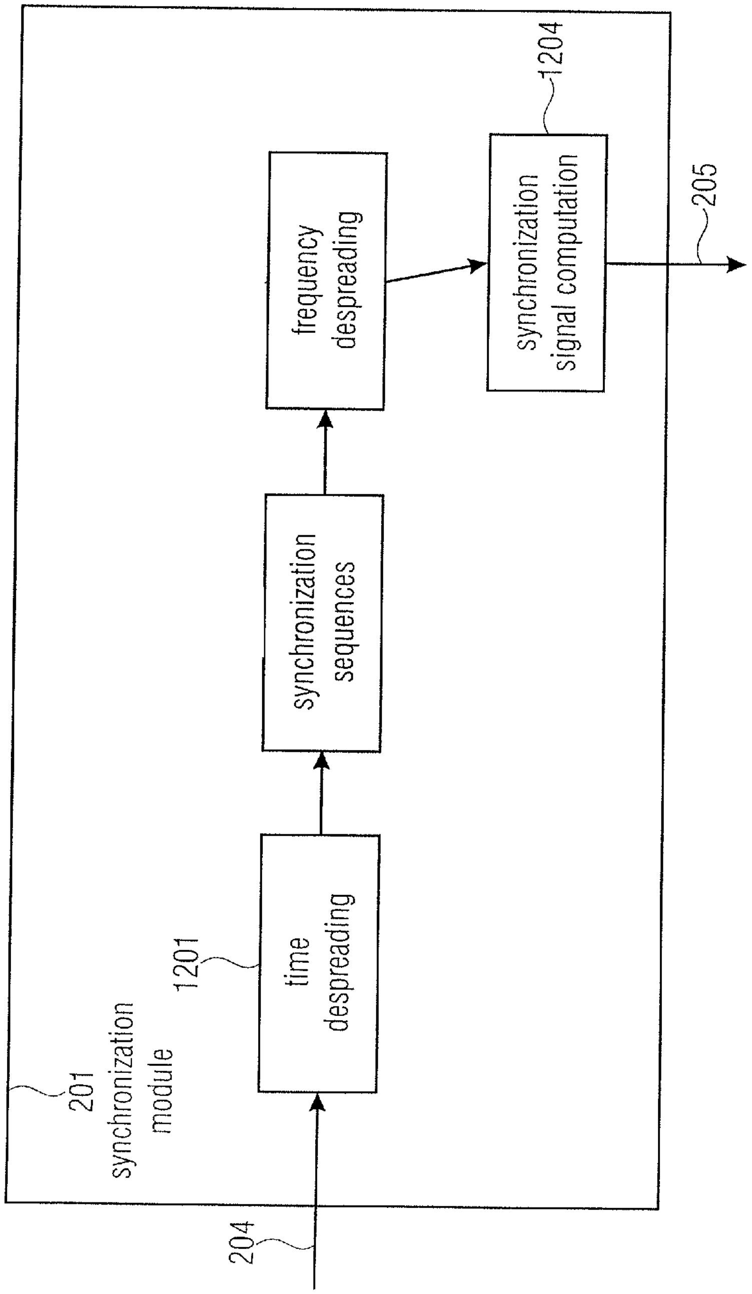
Figure 12E:
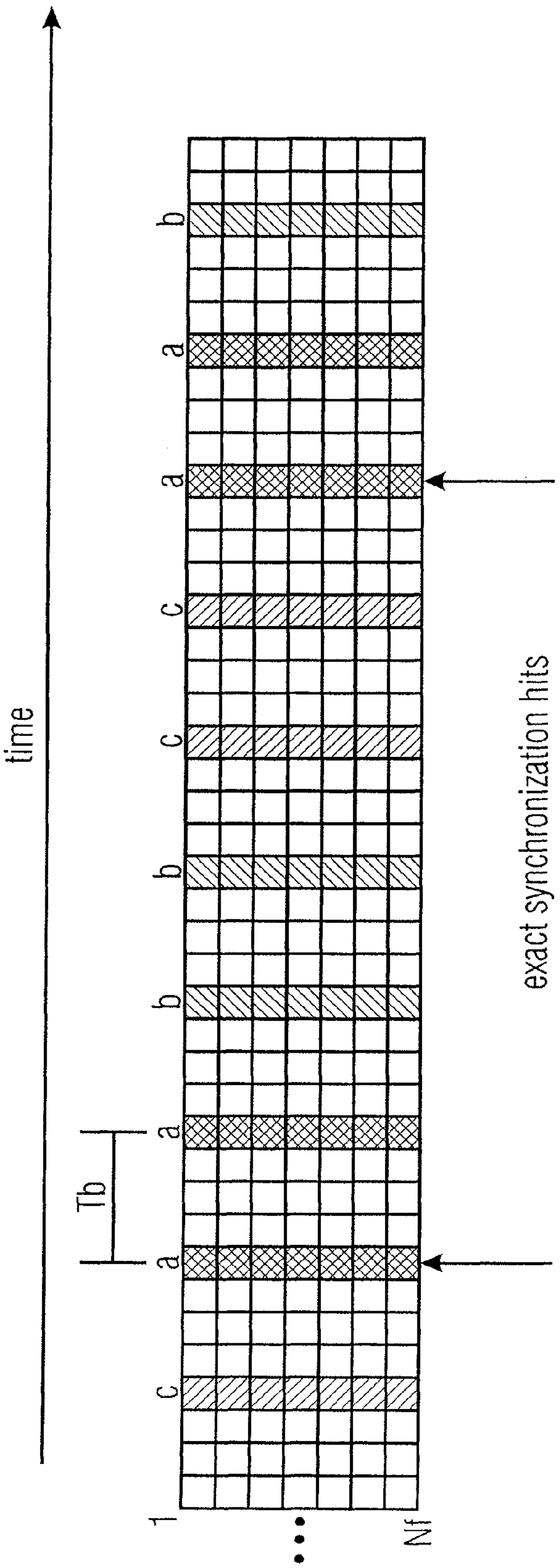
FIG. 12*e* shows a graphical representation of input data of the synchronization module.
Figure 12F:
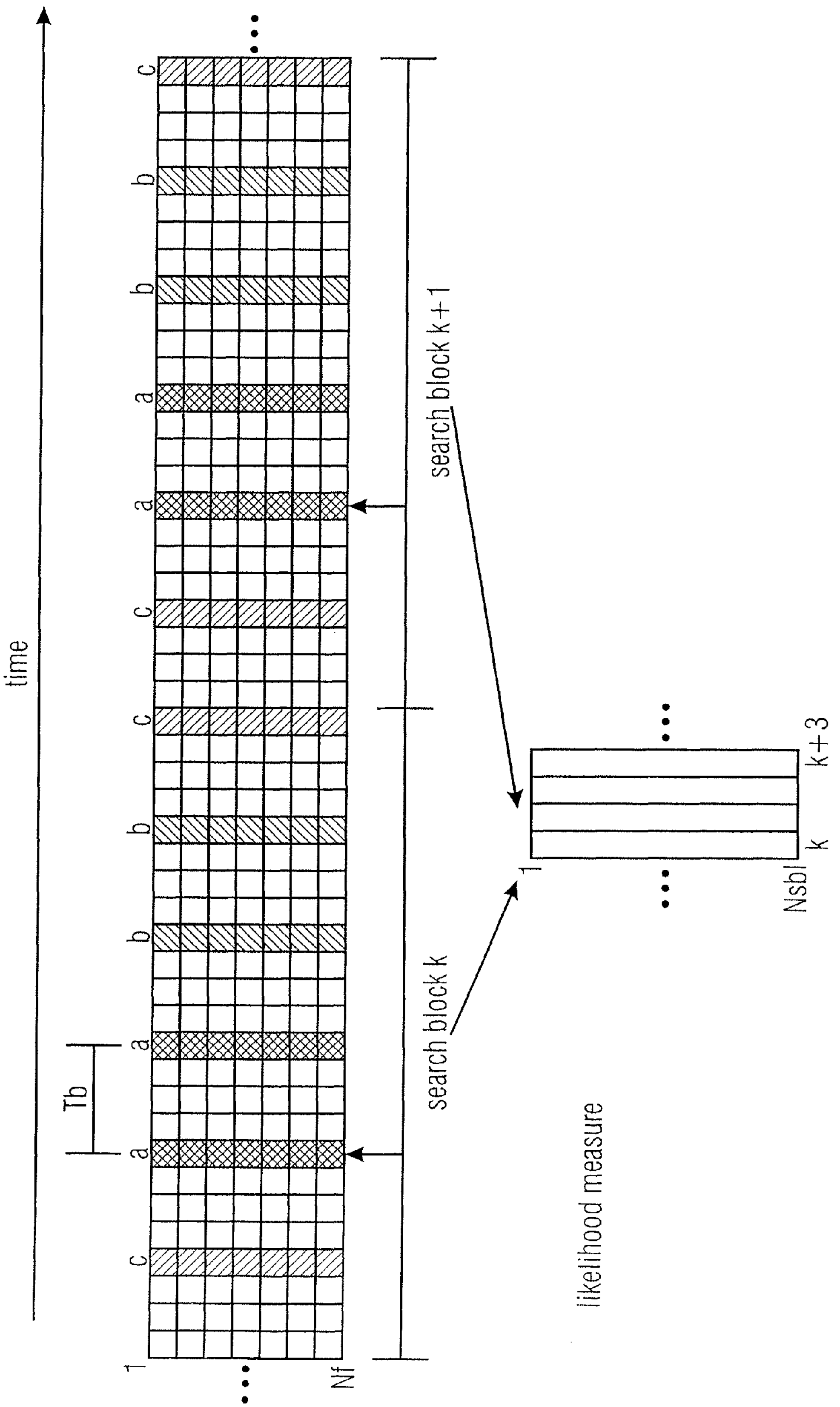
FIG. 12*f* shows a graphical representation of a concept of identifying a synchronization hit.

The processing blocks of the synchronization module are depicted in FIGS. 11*a* and 11*b*. The synchronization module carries out the bit synchronization and the message synchronization (either full or partial) at once by analyzing the output of the synchronization signature correlator 1201. The data in time/frequency domain 204 is provided by the analysis module. As the bit synchronization is not yet available, block 203 oversamples the data with factor $N_{os}$, as described in Section 3.3. An illustration of the input data is given in FIG. 12*e*. For this example we have taken $N_{os}=4$, $N_t=2$, and $N_s=3$. In other words, the synchronization signature consists of 3 sequences (denoted with a, b, and c). The time spreading, in this case with spreading sequence $c_t=[1\ 1]^T$, simply repeats each bit twice in time domain. The exact synchronization hits are denoted with arrows and correspond to the beginning of each synchronization signature. The period of the synchronization signature is $N_t\cdot N_{os}\cdot N_s=N_{sbl}$ which is 2·4·3=24, for example. Due to the periodicity of the synchronization signature, the synchronization signature correlator (1201) arbitrarily divides the time axis in blocks, called search blocks, of size $N_{sbl}$, whose subscript stands for search block length. Every search block has to contain (or typically contains) one synchronization hit as depicted in FIG. 12*f*. Each of the $N_{sbl}$ bits is a candidate synchronization hit. Block 1201's task is to compute a likelihood measure for each of candidate bit of each block. This information is then passed to block 1204 which computes the synchronization hits.

3.4.1 The Synchronization Signature Correlator 1201

Figure 12G:
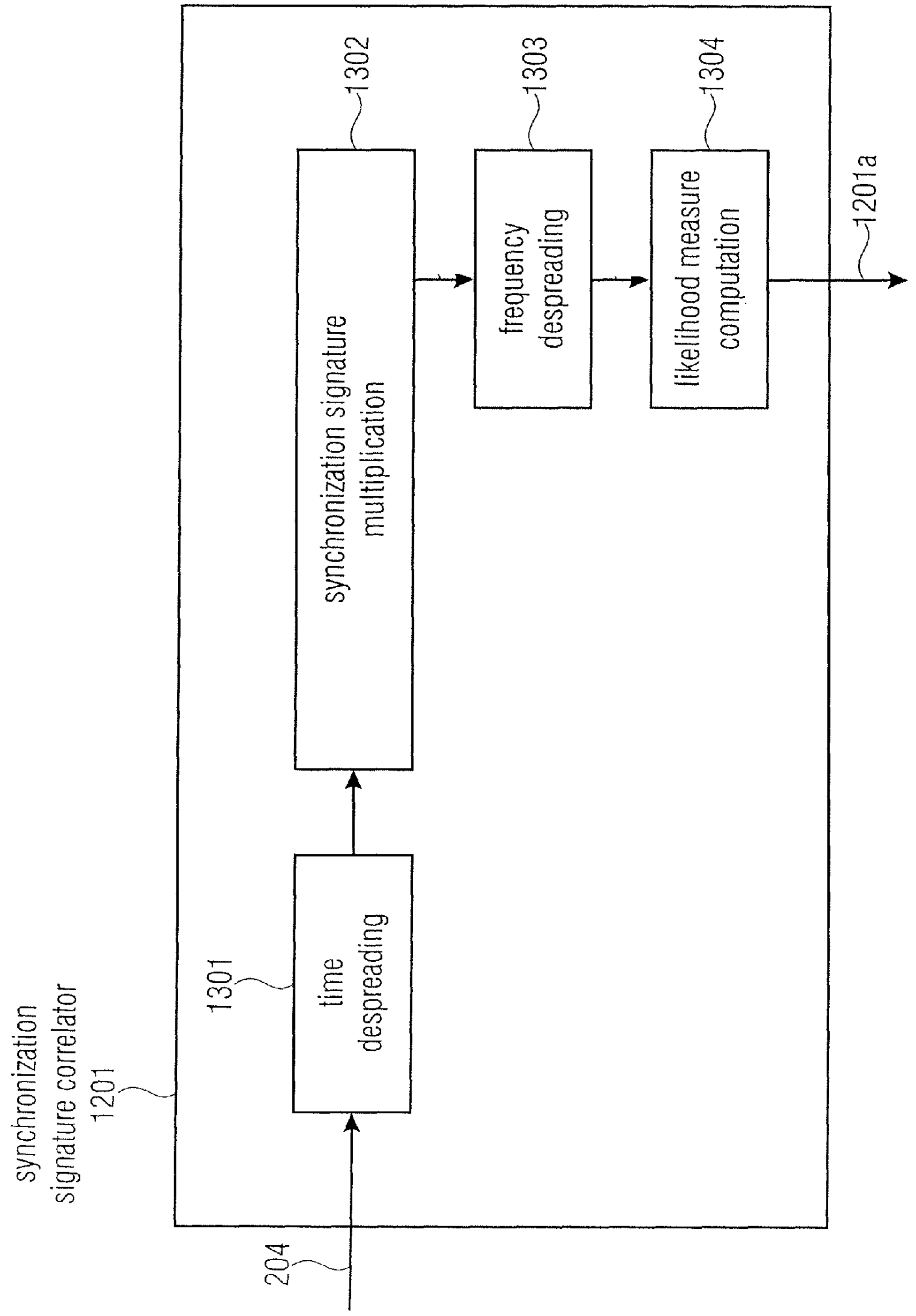
FIG. 12*g* shows a block-schematic diagram of a synchronization signature correlator.

For each of the $N_{sbl}$ candidate synchronization positions the synchronization signature correlator computes a likelihood measure, the latter is larger the more probable it is that the temporal alignment (both bit and partial or full message synchronization) has been found. The processing steps are depicted in FIG. 12*g*.

Accordingly, a sequence 1201*a* of likelihood values, associated with different positional choices, may be obtained.

Figure 13A:
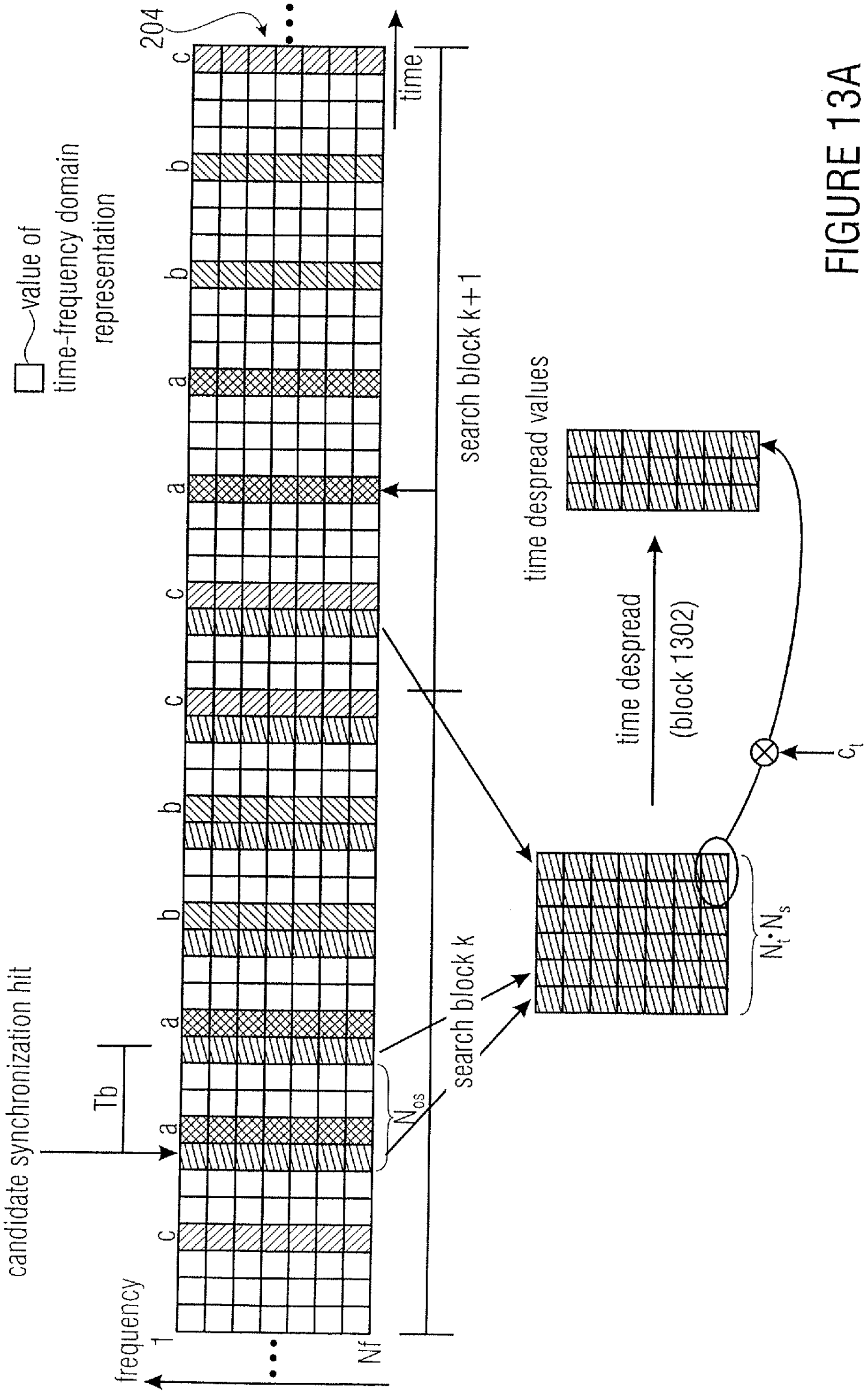
FIG. 13*a* shows a graphical representation of an example for a temporal despreading.

Block 1301 carries out the temporal despreading, i.e., multiplies every $N_t$ bits with the temporal spreading sequence $c_t$ and then sums them. This is carried out for each of the $N_f$ frequency subbands. FIG. 13*a* shows an example. We take the same parameters as described in the previous section, namely $N_{os}=4$, $N_t=2$, and $N_s=3$. The candidate synchronization position is marked. From that bit, with $N_{os}$ offset, $N_t\cdot N_s$ are taken by block 1301 and time despread with sequence $c_t$, so that Ns bits are left.

Figure 13B:
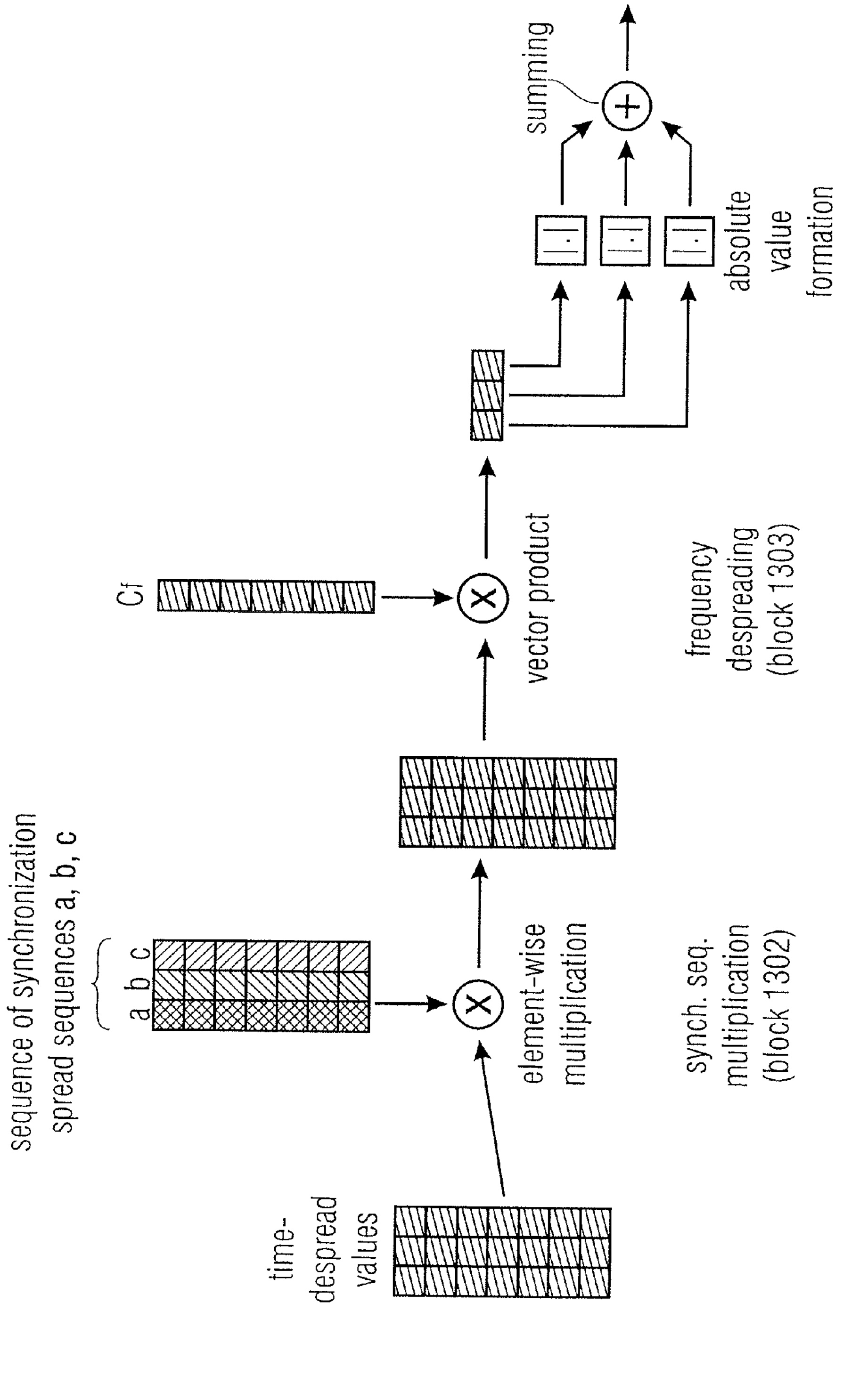
FIG. 13*b* shows a graphical representation of an example for an element-wise multiplication between bits and spreading sequences.

In block 1302 the bits are multiplied element-wise with the $N_s$ spreading sequences (see FIG. 13*b*).

In block 1303 the frequency despreading is carried out, namely, each bit is multiplied with the spreading sequence $c_f$ and then summed along frequency.

At this point, if the synchronization position were correct, we would have $N_s$ decoded bits. As the bits are not known to the receiver, block 1304 computes the likelihood measure by taking the absolute values of the $N_s$ values and sums.

The output of block 1304 is in principle a non coherent correlator which looks for the synchronization signature. In fact, when choosing a small $N_s$, namely the partial message synchronization mode, it is possible to use synchronization sequences (e.g. a, b, c) which are mutually orthogonal. In doing so, when the correlator is not correctly aligned with the signature, its output will be very small, ideally zero. When using the full message synchronization mode it is advised to use as many orthogonal synchronization sequences as possible, and then create a signature by carefully choosing the order in which they are used. In this case, the same theory can be applied as when looking for spreading sequences with good auto correlation functions. When the correlator is only slightly misaligned, then the output of the correlator will not be zero even in the ideal case, but anyway will be smaller compared to the perfect alignment, as the analysis filters cannot capture the signal energy optimally.

3.4.2 Synchronization Hits Computation 1204

Figure 13C:
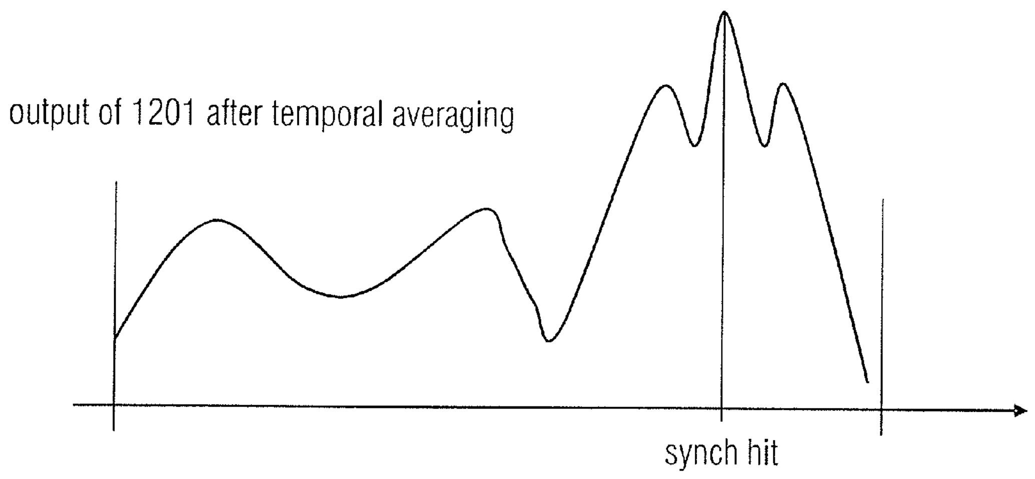
FIG. 13*c* shows a graphical representation of an output of the synchronization signature correlator after temporal averaging.
Figure 13D:
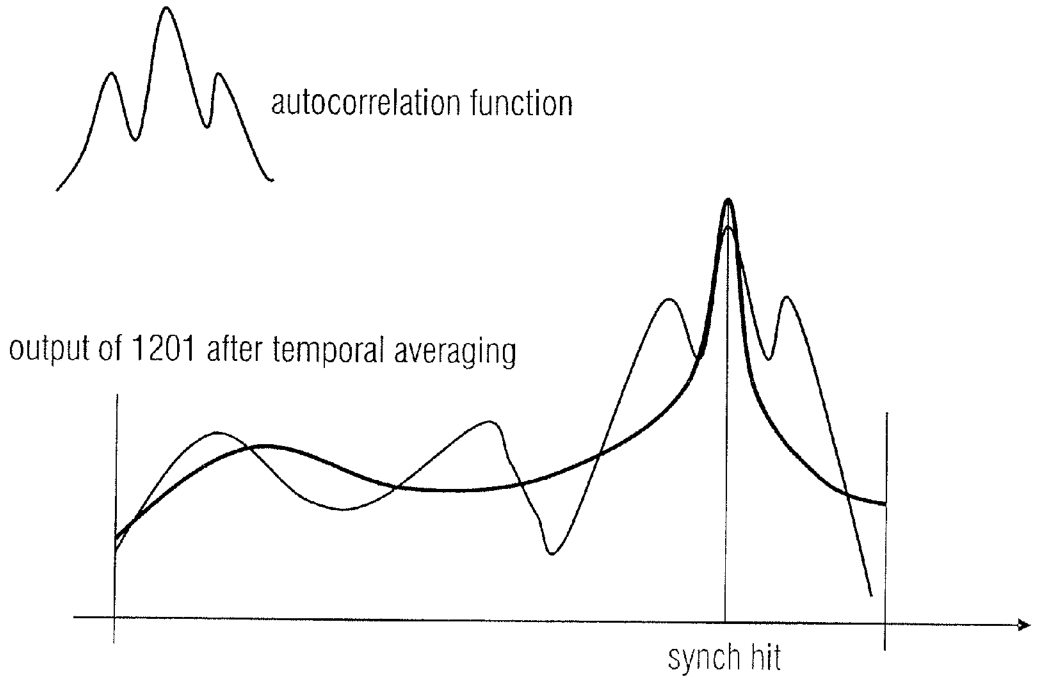
FIG. 13*d* shows a graphical representation of an output of the synchronization signature correlator filtered with the auto-correlation function of the synchronization signature.

This block analyzes the output of the synchronization signature correlator to decide where the synchronization positions are. Since the system is fairly robust against misalignments of up to $T_b/4$ and the $T_b$ is normally taken around 40 ms, it is possible to integrate the output of 1201 over time to achieve a more stable synchronization. A possible implementation of this is given by an IIR filter applied along time with a exponentially decaying impulse response. Alternatively, a traditional FIR moving average filter can be applied. Once the averaging has been carried out, a second correlation along different $N_t \cdot N_s$ is carried out ("different positional choice"). In fact, we want to exploit the information that the autocorrelation function of the synchronization function is known. This corresponds to a Maximum Likelihood estimator. The idea is shown in FIG. 13*c*. The curve shows the output of block 1201 after temporal integration. One possibility to determine the synchronization hit is simply to find the maximum of this function. In FIG. 13*d* we see the same function (in black) filtered with the autocorrelation function of the synchronization signature. The resulting function is plotted in red. In this case the maximum is more pronounced and gives us the position of the synchronization hit. The two methods are fairly similar for high SNR but the second method performs much better in lower SNR regimes. Once the synchronization hits have been found, they are passed to the watermark extractor 202 which decodes the data.

In some embodiments, in order to obtain a robust synchronization signal, synchronization is performed in partial message synchronization mode with short synchronization signatures. For this reason many decodings have to be done, increasing the risk of false positive message detections. To prevent this, in some embodiments signaling sequences may be inserted into the messages with a lower bit rate as a consequence.

This approach is a solution to the problem arising from a sync signature shorter than the message, which is already addressed in the above discussion of the enhanced synchronization. In this case, the decoder doesn't know where a new message starts and attempts to decode at several synchronization points. To distinguish between legitimate messages and false positives, in some embodiments a signaling word is used (i.e. payload is sacrified to embed a known control sequence). In some embodiments, a plausibility check is used (alternatively or in addition) to distinguish between legitimate messages and false positives.

3.5 The Watermark Extractor 202

Figure 14:
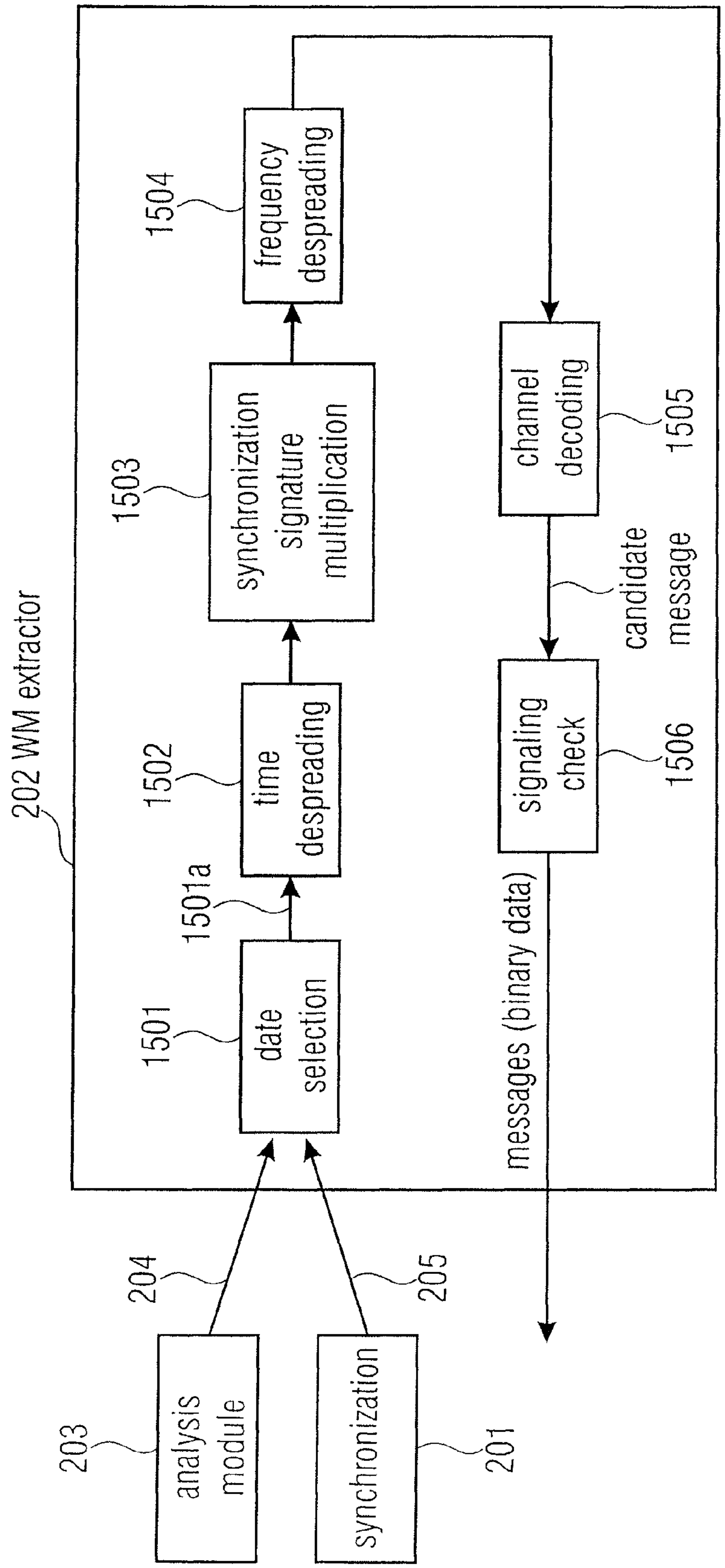
FIG. 14 shows a block-schematic diagram of a watermark extractor, according to an embodiment of the invention.

The parts constituting the watermark extractor 202 are depicted in FIG. 14. This has two inputs, namely 204 and 205 from blocks 203 and 201, respectively. The synchronization module 201 (see Section 3.4) provides synchronization timestamps, i.e., the positions in time domain at which a candidate message starts. More details on this matter are given in Section 3.4. The analysis filterbank block 203, on the other hand, provides the data in time/frequency domain ready to be decoded.

Figure 15:
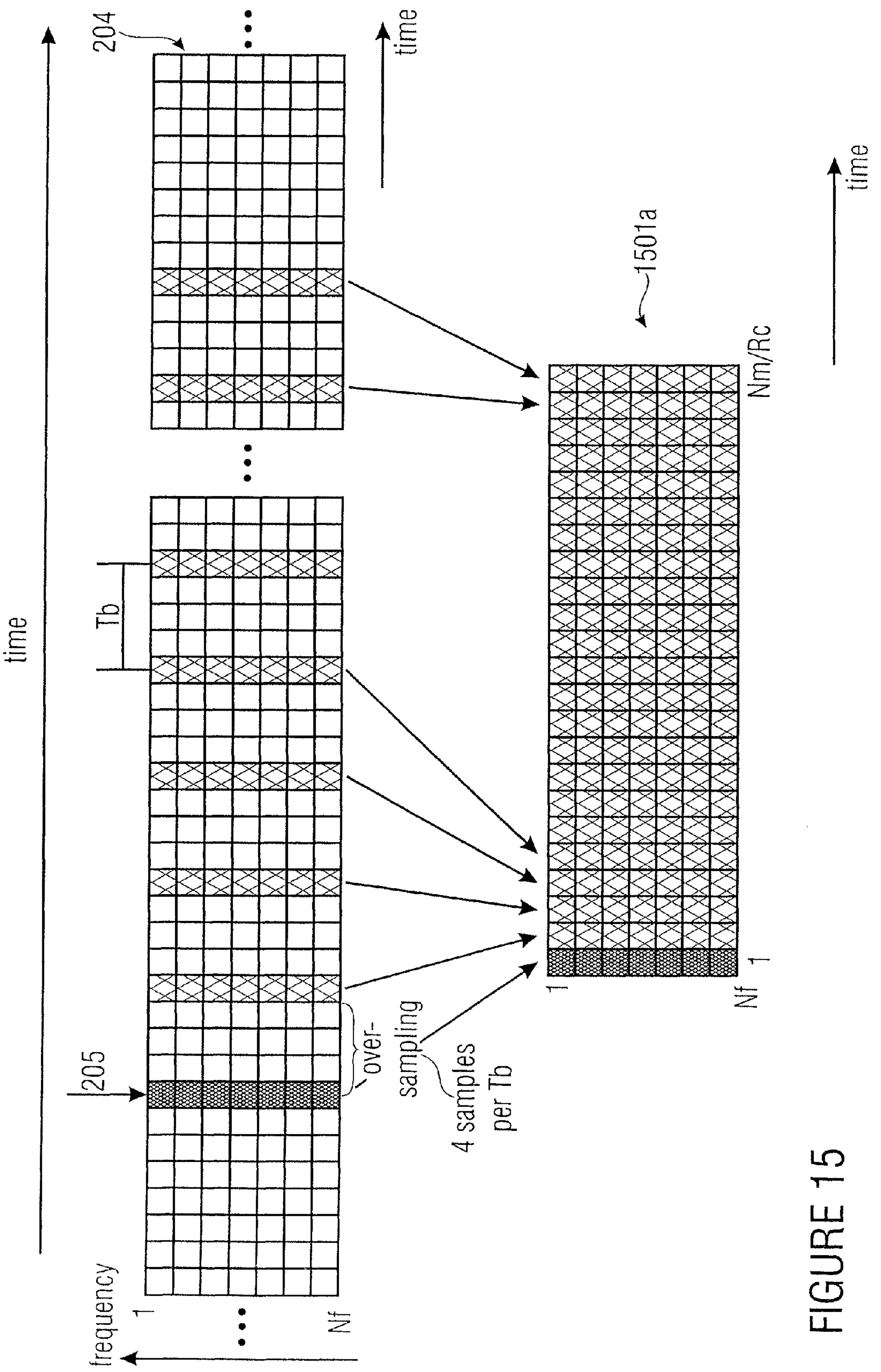
FIG. 15 shows a schematic representation of a selection of a part of the time-frequency-domain representation as a candidate message.

The first processing step, the data selection block 1501, selects from the input 204 the part identified as a candidate message to be decoded. FIG. 15 shows this procedure graphically. The input 204 consists of $N_f$ streams of real values. Since the time alignment is not known to the decoder a priori, the analysis block 203 carries out a frequency analysis with a rate higher than $1/T_b$ Hz (oversampling). In FIG. 15 we have used an oversampling factor of 4, namely, 4 vectors of size $N_f \times 1$ are output every $T_b$ seconds. When the synchronization block 201 identifies a candidate message, it delivers a timestamp 205 indicating the starting point of a candidate message. The selection block 1501 selects the information necessitated for the decoding, namely a matrix of size $N_f \times N_m/R_c$. This matrix 1501*a* is given to block 1502 for further processing.

Blocks 1502, 1503, and 1504 carry out the same operations of blocks 1301, 1302, and 1303 explained in Section 3.4.

An alternative embodiment of the invention consists in avoiding the computations done in 1502-1504 by letting the synchronization module deliver also the data to be decoded. Conceptually it is a detail. From the implementation point of view, it is just a matter of how the buffers are realized. In general, redoing the computations allows us to have smaller buffers.

The channel decoder 1505 carries out the inverse operation of block 302. If channel encoder, in a possible embodiment of this module, consisted of a convolutional encoder together with an interleaver, then the channel decoder would perform the deinterleaving and the convolutional decoding, e.g., with the well known Viterbi algorithm. At the output of this block we have $N_m$ bits, i.e., a candidate message.

Block 1506, the signaling and plausibility block, decides whether the input candidate message is indeed a message or not. To do so, different strategies are possible.

The basic idea is to use a signaling word (like a CRC sequence) to distinguish between true and false messages. This however reduces the number of bits available as payload. Alternatively we can use plausibility checks. If the messages for instance contain a timestamp, consecutive messages has to have consecutive timestamps. If a decoded message possesses a timestamp which is not the correct order, we can discard it.

When a message has been correctly detected the system may choose to apply the look ahead and/or look back mechanisms. We assume that both bit and message synchronization have been achieved. Assuming that the user is not zapping, the system "looks back" in time and attempts to decode the past messages (if not decoded already) using the same synchronization point (look back approach). This is particularly useful when the system starts. Moreover, in bad conditions, it might take 2 messages to achieve synchronization. In this case, the first message has no chance. With the look back option we can save "good" messages which have not been received only due to back synchronization. The look ahead is the same but works in the future. If we have a message now we know where the next message should be, and we can attempt to decode it anyhow.

3.6. Synchronization Details

Figure 18A:
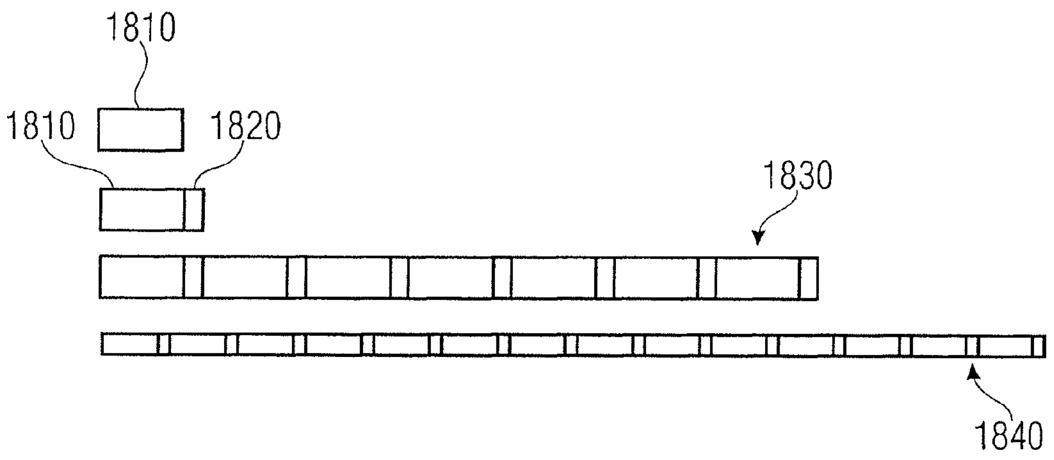
FIG. 18*a* shows a graphical representation of a payload, a payload with a Viterbi termination sequence, a Viterbi-encoded payload and a repetition-coded version of the Viterbi-coded payload.
Figure 18B:
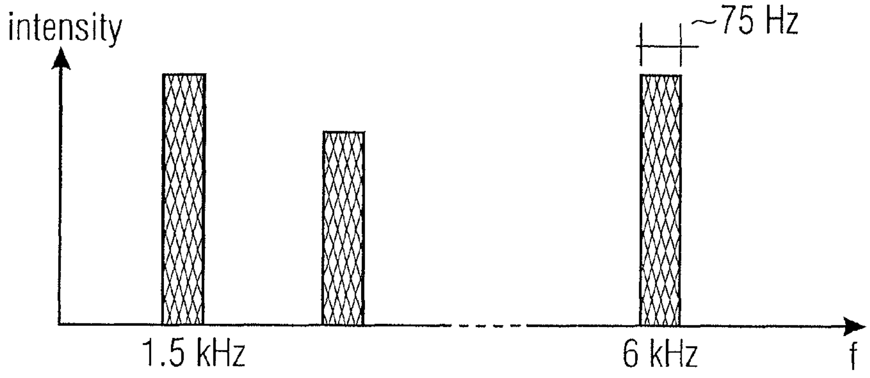
FIG. 18*b* shows a graphical representation of subcarriers used for embedding a watermarked signal.

For the encoding of a payload, for example, a Viterbi algorithm may be used. FIG. 18*a* shows a graphical representation of a payload 1810, a Viterbi termination sequence 1820, a Viterbi encoded payload 1830 and a repetition-coded version 1840 of the Viterbi-coded payload. For example, the payload length may be 34 bits and the Viterbi termination sequence may comprise 6 bits. If, for example a Viterbi code rate of 1/7 may be used the Viterbi-coded payload may comprise (34+6)*7=280 bits. Further, by using a repetition coding of 1/2, the repetition coded version 1840 of the Viterbi-encoded payload 1830 may comprise 280*2=560 bits. In this example, considering a bit time interval of 42.66 ms, the message length would be 23.9 s. The signal may be embedded with, for example, 9 subcarriers (e.g. placed according to the critical bands) from 1.5 to 6 kHz as indicated by the frequency spectrum shown in FIG. 18*b*. Alternatively, also another number of subcarriers (e.g. 4, 6, 12, 15 or a number between 2 and 20) within a frequency range between 0 and 20 kHz maybe used.

Figure 19:
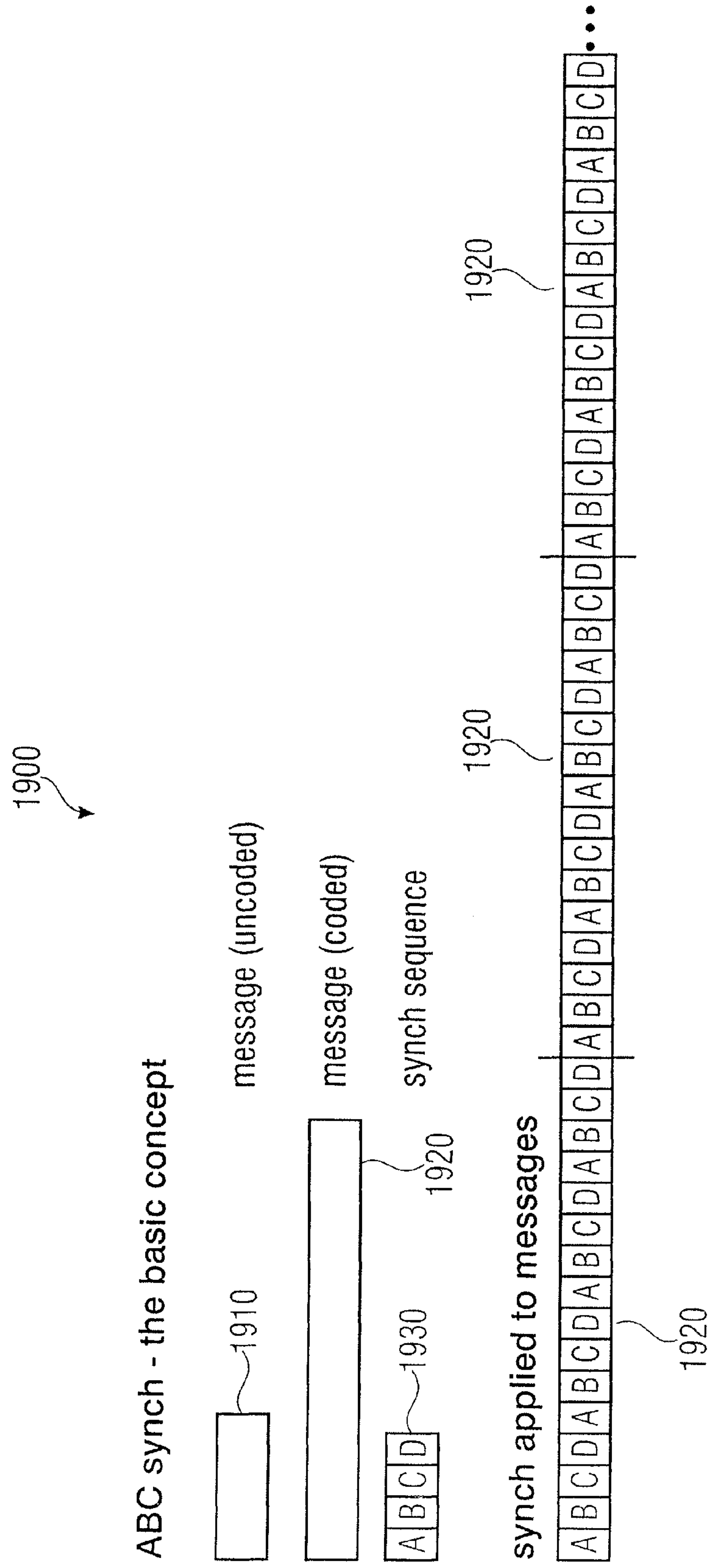
FIG. 19 shows a graphical representation of an uncoded message, a coded message, a synchronization message and a watermark signal, in which the synchronization sequence is applied to the messages.

FIG. 19 shows a schematic illustration of the basic concept 1900 for the synchronization, also called ABC synch. It shows a schematic illustration of an uncoded messages 1910, a coded message 1920 and a synchronization sequence (synch sequence) 1930 as well as the application of the synch to several messages 1920 following each other.

The synchronization sequence or synch sequence mentioned in connection with the explanation of this synchronization concept (shown in FIG. 19-23) may be equal to the synchronization signature mentioned before.

Figure 20:
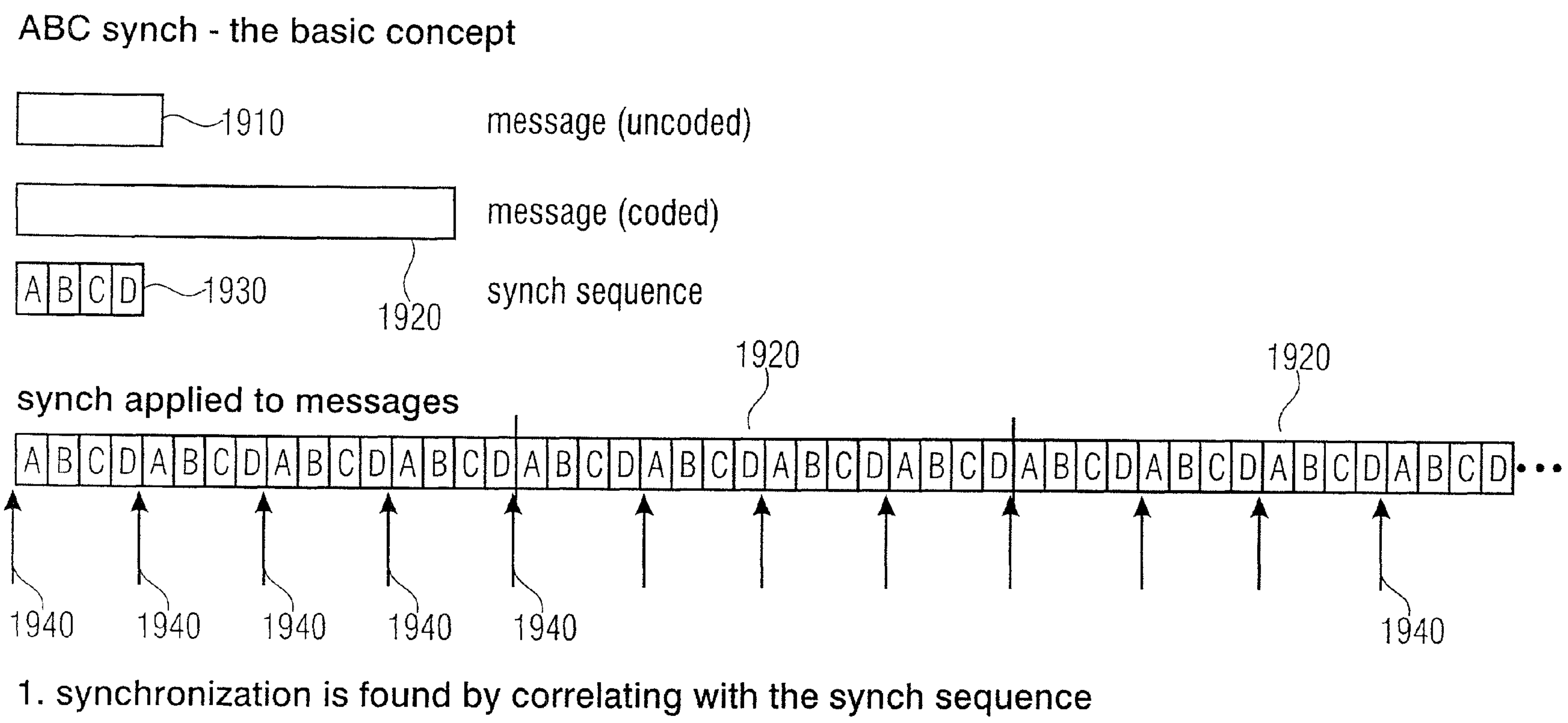
FIG. 20 shows a schematic representation of a first step of a so-called "ABC synchronization" concept.
Figure 21:
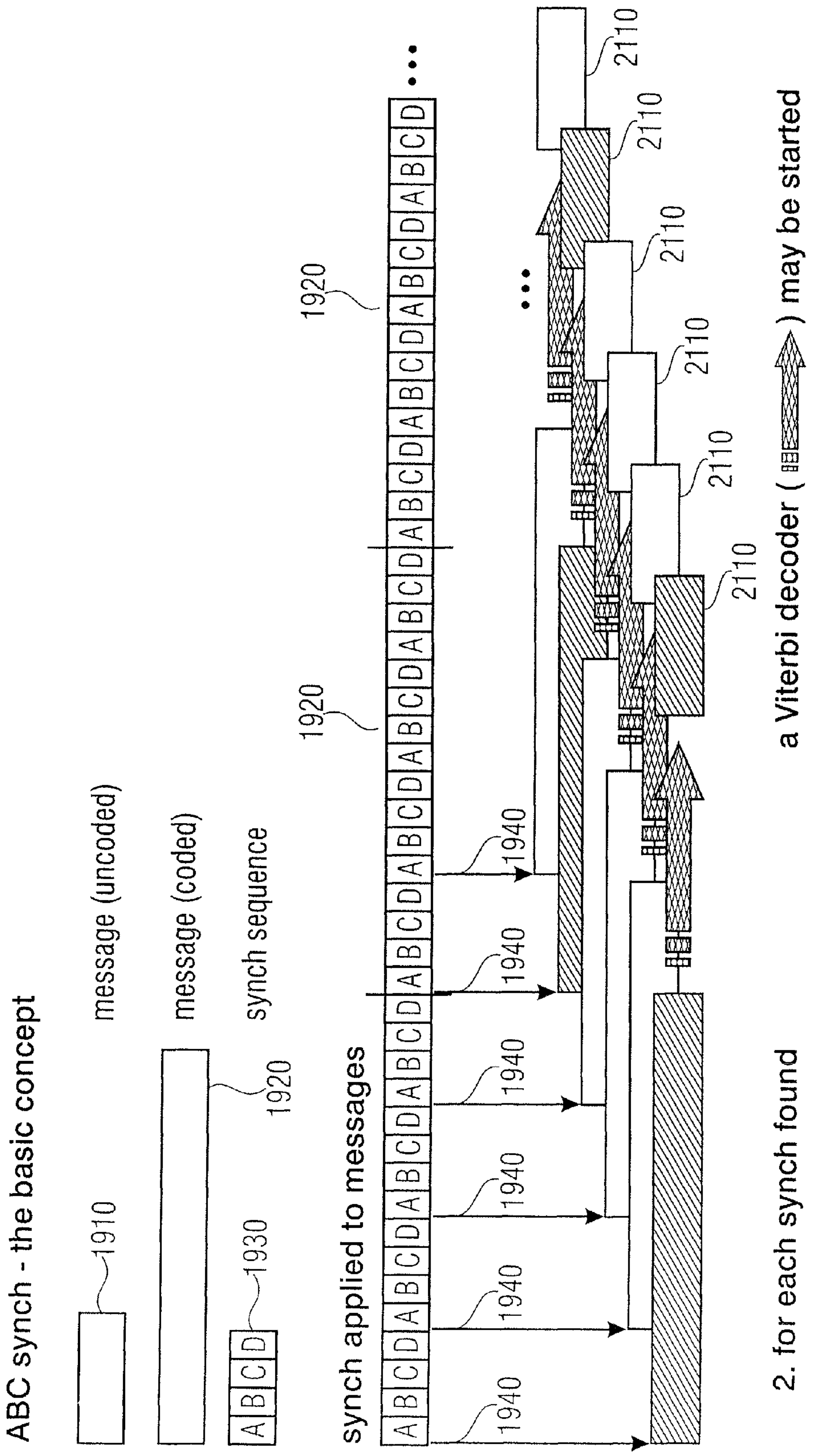
FIG. 21 shows a graphical representation of a second step of the so-called "ABC synchronization" concept.

Further, FIG. 20 shows a schematic illustration of the synchronization found by correlating with the synch sequence. If the synchronization sequence 1930 is shorter than the message, more than one synchronization point 1940 (or alignment time block) may be found within a single message. In the example shown in FIG. 20, 4 synchronization points are found within each message. Therefore, for each synchronization found, a Viterbi decoder (a Viterbi decoding sequence) may be started. In this way, for each synchronization point 1940 a message 2110 may be obtained, as indicated in FIG. 21.

Figure 22:
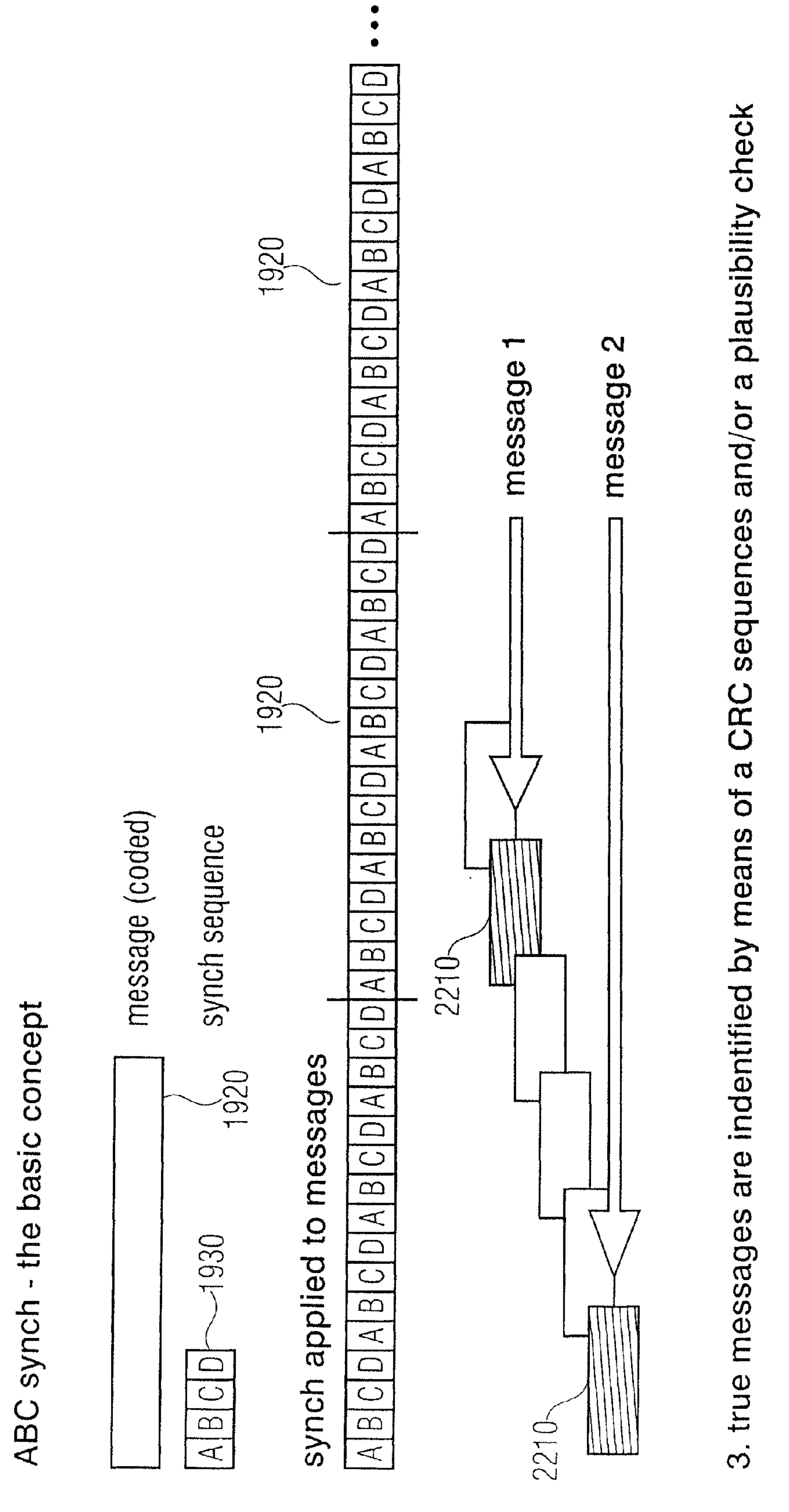
FIG. 22 shows a graphical representation of a third step of the so-called "ABC synchronization" concept.

Based on these messages the true messages 2210 may be identified by means of a CRC sequence (cyclic redundancy check sequence) and/or a plausibility check, as shown in FIG. 22.

Figure 23:
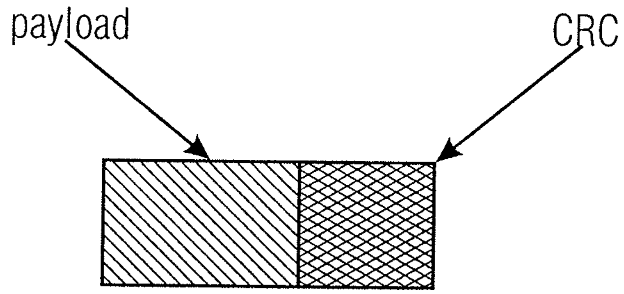
FIG. 23 shows a graphical representation of a message comprising a payload and a CRC portion.

The CRC detection (cyclic redundancy check detection) may use a known sequence to identify true messages from false positive. FIG. 23 shows an example for a CRC sequence added to the end of a payload.

The probability of false positive (a message generated based on a wrong synchronization point) may depend on the length of the CRC sequence and the number of Viterbi decoders (number of synchronization points within a single message) started. To increase the length of the payload without increasing the probability of false positive a plausibility may be exploited (plausibility test) or the length of the synchronization sequence (synchronization signature) may be increased.

4. Concepts and Advantages

In the following, some aspects of the above discussed system will be described, which are considered as being innovative. Also, the relation of those aspects to the state-of-the-art technologies will be discussed.

4.1. Continuous Synchronization

Some embodiments allow for a continuous synchronization. The synchronization signal, which we denote as synchronization signature, is embedded continuously and parallel to the data via multiplication with sequences (also designated as synchronization spread sequences) known to both transmit and receive side.

Some conventional systems use special symbols (other than the ones used for the data), while some embodiments according to the invention do not use such special symbols. Other classical methods consist of embedding a known sequence of bits (preamble) time-multiplexed with the data, or embedding a signal frequency-multiplexed with the data.

However, it has been found that using dedicated sub-bands for synchronization is undesired, as the channel might have notches at those frequencies, making the synchronization unreliable. Compared to the other methods, in which a preamble or a special symbol is time-multiplexed with the data, the method described herein is more advantageous as the method described herein allows to track changes in the synchronization (due e.g. to movement) continuously.

Furthermore, the energy of the watermark signal is unchanged (e.g. by the multiplicative introduction of the watermark into the spread information representation), and the synchronization can be designed independent from the psychoacoustical model and data rate. The length in time of the synchronization signature, which determines the robustness of the synchronization, can be designed at will completely independent of the data rate.

Another classical method consists of embedding a synchronization sequence code-multiplexed with the data. When compared to this classical method, the advantage of the method described herein is that the energy of the data does not represent an interfering factor in the computation of the correlation, bringing more robustness. Furthermore, when using code-multiplexing, the number of orthogonal sequences available for the synchronization is reduced as some are necessitated for the data.

To summarize, the continuous synchronization approach described herein brings along a large number of advantages over the conventional concepts.

However, in some embodiments according to the invention, a different synchronization concept may be applied.

4.2. 2D Spreading

Some embodiments of the proposed system carry out spreading in both time and frequency domain, i.e. a 2-dimensional spreading (briefly designated as 2D-spreading). It has been found that this is advantageous with respect to 1D systems as the bit error rate can be further reduced by adding redundance in e.g. time domain.

However, in some embodiments according to the invention, a different spreading concept may be applied.

4.3. Differential Encoding and Differential Decoding

In some embodiments according to the invention, an increased robustness against movement and frequency mismatch of the local oscillators (when compared to conventional systems) is brought by the differential modulation. It has been found that in fact, the Doppler effect (movement) and frequency mismatches lead to a rotation of the BPSK constellation (in other words, a rotation on the complex plane of the bits). In some embodiments, the detrimental effects of such a rotation of the BPSK constellation (or any other appropriate modulation constellation) are avoided by using a differential encoding or differential decoding.

However, in some embodiments according to the invention, a different encoding concept or decoding concept may be applied. Also, in some cases, the differential encoding may be omitted.

4.4. Bit Shaping

In some embodiments according to the invention, bit shaping brings along a significant improvement of the system performance, because the reliability of the detection can be increased using a filter adapted to the bit shaping.

In accordance with some embodiments, the usage of bit shaping with respect to watermarking brings along improved reliability of the watermarking process. It has been found that particularly good results can be obtained if the bit shaping function is longer than the bit interval.

However, in some embodiments according to the invention, a different bit shaping concept may be applied. Also, in some cases, the bit shaping may be omitted.

4.5. Interactive Between Psychoacoustic Model (PAM) and Filter Bank (FB) Synthesis In some embodiments, the psychoacoustical model interacts with the modulator to fine tune the amplitudes which multiply the bits.

However, in some other embodiments, this interaction may be omitted.

4.6. Look Ahead and Look Back Features

In some embodiments, so called "Look back" and "look ahead" approaches are applied.

In the following, these concepts will be briefly summarized. When a message is correctly decoded, it is assumed that synchronization has been achieved. Assuming that the user is not zapping, in some embodiments a look back in time is performed and it is tried to decode the past messages (if not decoded already) using the same synchronization point (look back approach). This is particularly useful when the system starts.

In bad conditions, it might take 2 messages to achieve synchronization. In this case, the first message has no chance in conventional systems. With the look back option, which is used in some embodiments of the invention, it is possible to save (or decode) "good" messages which have not been received only due to back synchronization.

The look ahead is the same but works in the future. If I have a message now I know where my next message should be, and I can try to decode it anyhow. Accordingly, overlapping messages can be decoded.

However, in some embodiments according to the invention, the look ahead feature and/or the look back feature may be omitted.

4.7. Increased Synchronization Robustness

In some embodiments, in order to obtain a robust synchronization signal, synchronization is performed in partial message synchronization mode with short synchronization signatures. For this reason many decodings have to be done, increasing the risk of false positive message detections. To prevent this, in some embodiments signaling sequences may be inserted into the messages with a lower bit rate as a consequence.

However, in some embodiments according to the invention, a different concept for improving the synchronization robustness may be applied. Also, in some cases, the usage of any concepts for increasing the synchronization robustness may be omitted.

4.8. Other Enhancements

In the following, some other general enhancements of the above described system with respect to background art will be put forward and discussed:

1. lower computational complexity
2. better audio quality due to the better psychoacoustical model
3. more robustness in reverberant environments due to the narrowband multicarrier signals
4. an SNR estimation is avoided in some embodiments. This allows for better robustness, especially in low SNR regimes.

Some embodiments according to the invention are better than conventional systems, which use very narrow bandwidths of, for example, 8 Hz for the following reasons:

1. 8 Hz bandwidths (or a similar very narrow bandwidth) necessitates very long time symbols because the psychoacoustical model allows very little energy to make it inaudible;
2. 8 Hz (or a similar very narrow bandwidth) makes it sensitive against time varying Doppler spectra. Accordingly, such a narrow band system is typically not good enough if implemented, e.g., in a watch.

Some embodiments according to the invention are better than other technologies for the following reasons:

1. Techniques which input an echo fail completely in reverberant rooms. In contrast, in some embodiments of the invention, the introduction of an echo is avoided.
2. Techniques which use only time spreading have longer message duration in comparison embodiments of the above described system in which a two-dimensional spreading, for example both in time and in frequency, is used.

Some embodiments according to the invention are better than the system described in DE 196 40 814, because one of more of the following disadvantages of the system according to said document are overcome:

- the complexity in the decoder according to DE 196 40 814 is very high, a filter of length 2N with N=128 is used
- the system according to DE 196 40 814 comprises a long message duration
- in the system according to DE 196 40 814 spreading only in time domain with relatively high spreading gain (e.g. 128)
- in the system according to DE 196 40 814 the signal is generated in time domain, transformed to spectral domain, weighted, transformed back to time domain, and superposed to audio, which makes the system very complex 5. Applications The invention comprises a method to modify an audio signal in order to hide digital data and a corresponding decoder capable of retrieving this information while the perceived quality of the modified audio signal remains indistinguishable to the one of the original.

Examples of possible applications of the invention are given in the following:

1. Broadcast monitoring: a watermark containing information on e.g. the station and time is hidden in the audio signal of radio or television programs. Decoders, incorporated in small devices worn by test subjects, are capable to retrieve the watermark, and thus collect valuable information for advertisements agencies, namely who watched which program and when.
2. Auditing: a watermark can be hidden in, e.g., advertisements. By automatically monitoring the transmissions of a certain station it is then possible to know when exactly the ad was broadcast. In a similar fashion it is possible to retrieve statistical information about the programming schedules of different radios, for instance, how often a certain music piece is played, etc.
3. Metadata embedding: the proposed method can be used to hide digital information about the music piece or program, for instance the name and author of the piece or the duration of the program etc.

6. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded watermark signal, or an audio signal into which the watermark signal is embedded, can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A watermark generator for providing a watermark signal in dependence on binary message data, the watermark generator comprising:

an information processor configured to provide, in dependence on a single message bit of the binary message data, a 2-dimensional spread information representing the message bit in the form of a set of time-frequency-domain values; and a watermark signal provider configured to provide the watermark signal on the basis of the 2-dimensional spread information;

wherein the information processor is configured to spread a first message bit in a first spreading direction using a first spread sequence and to spread a second message bit in the first spreading direction using the first spread sequence, in order to acquire an intermediate information representation, to combine the intermediate information representation with an overlay information representation, in order to obtain a combined information representation, and to spread the combined information representation in a second direction using a second spread sequence, in order to acquire the 2-dimensional spread information, wherein the information processor is configured to combine the intermediate information representation with the overlay information representation, which is spread in the first spreading direction using a plurality of overlay information spreading sequences, such that the first spread message bit is multiplied with a first overlay information spread sequence, and such that the second spread message bit is multiplied with a second overlay information spread sequence, wherein the first overlay information spread sequence and the second overlay information spread sequence are orthogonal.

2. The watermark generator according to claim 1, wherein the first spread sequence comprises a size $N_f \times 1$ where $N_f$ designates a frequency spreading width.

3. The watermark generator according to claim 1, wherein the first spread sequence defines a spreading in frequency direction only.

4. The watermark generator according to claim 1, wherein the information processor is configured to spread the message bit in a first spreading direction using a first spread sequence, in order to acquire an intermediate information representation, to combine the intermediate information representation with an overlay information representation, in order to acquire a combined information representation, and to spread the combined information representation in a second direction using a second spread sequence, in order to acquire the 2-dimensional spread information.

5. The watermark generator according to claim 4, wherein the information processor is configured to combine the intermediate information representation with an overlay information representation, which is spread in the first spreading direction using an overlay information spreading sequence, such that the message bit and the overlay information are spread with different spreading sequences in the first spreading direction, and such that the combination of the message bit and the overlay information is spread with a common spreading sequence in the second spreading direction.

6. The watermark generator according to claim 4, wherein the information processor is configured to multiplicatively combine the intermediate information representation with the overlay information representation, and to spread the combined information representation, which comprises product values formed in dependence on values of the intermediate information representation and values of the overlap information, in the second spreading direction using the second spreading sequence, such that the product values are spread using a common spread sequence.

7. The watermark generator according to claim 1, wherein the information processor is configured to selectively spread a given message bit onto a first bit representation, which is a positive multiple of a bit spread sequence, or onto a second bit representation, which is a negative multiple of the bit spread sequence, in dependence on the value of the given bit, in order to spread the message bit in the first spreading direction.

8. The watermark generator according to claim 1, wherein the information processor is configured to map a given value of an intermediate information representation, which is acquired by spreading the message bit in the first spreading direction, or a given value of a combined information representation, which is acquired by spreading the message bit in the first spreading direction and combining the result thereof with an overlay information representation, onto a set of spread values, such that the set of spread values is a scaled version of a second spread sequence, scaled in accordance with the given value.

9. The watermark generator according to claim 1, wherein the information processor is configured to acquire, as an intermediate information representation, a spread information representation R according to $$R=c_f \cdot m,$$

wherein $c_f$ is a vector of size $N_f \times 1$ representing a bit spreading sequence of frequency spreading width $N_f$, wherein m is a vector of size $1 \times N_{mc}$ representing $N_{mc}$ bits of the binary message data, wherein different binary values of the bits are represented by entries of the vector m with different sign and wherein "·" designates a matrix multiplication operator; and wherein the information processor is configured to acquire the 2-dimensional spread information B using an operation $B=R' \diamond c_t^T$, wherein R' is equal to R or acquired by combining R with an overlay information;

wherein $\diamond$ designates a Kronecker product operator, and wherein $^T$ designates a transpose operator.

10. A watermark decoder for providing binary message data in dependence on a watermarked signal, the watermark decoder comprising:

a time-frequency-domain representation provider configured to provide a time-frequency-domain representation of the watermarked signal;

a synchronization determinator comprising a despreader including one or more despreader blocks, wherein the despreader is configured to perform a 2-dimensional despreading in order to acquire a synchronization information in dependence on a 2-dimensional portion of the time-frequency-domain representation; and a watermark extractor configured to extract the binary message data from the time-frequency-domain representation of the watermarked signal using the synchronization information;

wherein the despreader is configured to acquire a set of temporally despread values, wherein the despreader is configured to multiply a plurality of values of the time-frequency-domain representation with values of a temporal despread sequence, and to add results of the multiplications in order to acquire one of the temporally despread values, and wherein the despreader is configured to multiply the temporally despread values with values of a frequency despread sequence in an element-wise manner, and to add results of the multiplications to acquire a 2-dimensionally despread value;

wherein the despreader is configured to multiply subsequent sets of temporally despread values with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

11. The watermark decoder according to claim 10, wherein the despreader is configured to multiply a plurality of values of the time-frequency-domain representation with values of a temporal despread sequence and to add results of the multiplications in order to acquire a temporally despread value, and wherein the despreader is configured to multiply a plurality of temporally despread values associated with different frequencies of the time-frequency-domain representation, or values derived therefrom, with a frequency despread sequence in an element-wise manner and to add results of the multiplication in order to acquire a 2-dimensionally despread value.

12. The watermark decoder according to claim 10, wherein the despreader is configured to acquire a set of temporally despread values, wherein the despreader is configured to multiply a plurality of values of the time-frequency-domain representation with values of a temporal despread sequence, and to add results of the multiplications in order to acquire one of the temporally despread values, and wherein the despreader is configured to multiply the temporally despread values with values of a frequency despread sequence in an element-wise manner, and to add results of the multiplications to acquire a 2-dimensionally despread value.

13. The watermark decoder according to claim 12, wherein the despreader is configured to multiply subsequent sets of temporally despread values with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence.

14. A watermark decoder for providing binary message data in dependence on a watermarked signal, the watermark decoder comprising:

a time-frequency-domain representation provider configured to provide a time-frequency-domain representation of the watermarked signal; and a watermark extractor comprising a despreader including one or more despreader blocks, wherein the despreader is configured to perform a 2-dimensional despreading in order to acquire a bit of the binary message data in dependence on a 2-dimensional portion of the time-frequency-domain representation;

wherein the despreader is configured to acquire a set of temporally despread values, wherein the despreader is configured to multiply a plurality of values of the time-frequency-domain representation with values of a temporal despread sequence, and to add results of the multiplications in order to acquire one of the temporally despread values, and wherein the despreader is configured to multiply the temporally despread values with values of a frequency despread sequence in an element-wise manner, and to add results of the multiplications to acquire a 2-dimensionally despread value;

wherein the despreader is configured to multiply subsequent sets of temporally despread values with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

15. A method for providing a watermark signal in dependence on binary message data, the method comprising:

Providing, in dependence on a single message bit of the binary message data, a 2-dimensional spread information representing the message bit in the form of a set of time-frequency-domain values; and providing the watermark signal on the basis of the 2-dimensional spread information;

wherein a first message bit is spread in a first spreading direction using a first spread sequence and a second message bit is spread in the first spreading direction using the first spread sequence, in order to acquire an intermediate information representation, and wherein the intermediate information representation is combined with an overlay information representation, in order to acquire a combined information representation, and wherein the combined information representation is spread in a second direction using a second spread sequence, in order to acquire the 2-dimensional spread information, wherein the intermediate information representation is combined with the overlay information representation, which is spread in the first spreading direction using a plurality of overlay information spreading sequences, such that the first spread message bit is multiplied with a first overlay information spread sequence, and such that the second spread message bit is multiplied with a second overlay information spread sequence, wherein the first overlay information spread sequence and the second overlay information spread sequence are orthogonal.

16. A method for providing binary message data in dependence on a watermarked signal, the method comprising:

providing a time-frequency-domain representation of the watermarked signal; and performing a 2-dimensional despreading in order to acquire a bit of the binary message data or a synchronization information used to extract the binary message data from the time-frequency-domain representation of the watermark signal in dependence on a 2-dimensional portion of the time-frequency-domain representation;

wherein a set of temporally despread values is acquired, wherein a plurality of values of the time-frequency-domain representation is multiplied with values of a temporal despread sequence, and wherein results of the multiplications are added in order to acquire one of the temporally despread values, and wherein the temporally despread values are multiplied with values of a frequency despread sequence in an element-wise manner, and wherein results of the multiplications are added to acquire a 2-dimensionally despread value;

wherein subsequent sets of temporally despread values are multiplied with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

17. A non-transitory computer readable medium including a computer program for performing, when the computer program runs on a computer, a method for providing a watermark signal in dependence on binary message data, the method comprising:

providing, in dependence on a single message bit of the binary message data, a 2-dimensional spread information representing the message bit in the form of a set of time-frequency-domain values; and providing the watermark signal on the basis of the 2-dimensional spread information;

wherein a first message bit is spread in a first spreading direction using a first spread sequence and a second message bit is spread in the first spreading direction using the first spread sequence, in order to acquire an intermediate information representation, and wherein the intermediate information representation is combined with an overlay information representation, in order to acquire a combined information representation, and wherein the combined information representation is spread in a second direction using a second spread sequence, in order to acquire the 2-dimensional spread information, wherein the intermediate information representation is combined with the overlay information representation, which is spread in the first spreading direction using a plurality of overlay information spreading sequences, such that the first spread message bit is multiplied with a first overlay information spread sequence, and such that the second spread message bit is multiplied with a second overlay information spread sequence, wherein the first overlay information spread sequence and the second overlay information spread sequence are orthogonal.

18. A non-transitory computer readable medium including a computer program for performing, when the computer program runs on a computer, a method for providing binary message data in dependence on a watermarked signal, the method comprising:

providing a time-frequency-domain representation of the watermarked signal; and performing a 2-dimensional despreading in order to acquire a bit of the binary message data or a synchronization information used to extract the binary message data from the time-requency-domain representation of the watermark signal in dependence on a 2-dimensional portion of the time-frequency-domain representation;

wherein a set of temporally despread values is acquired, wherein a plurality of values of the time-frequency-domain representation is multiplied with values of a temporal despread sequence, and wherein results of the multiplications are added in order to acquire one of the temporally despread values, and wherein the temporally despread values are multiplied with values of a frequency despread sequence in an element-wise manner, and wherein results of the multiplications are added to acquire a 2-dimensionally despread value;

wherein subsequent sets of temporally despread values are multiplied with values of different frequency despread sequences in an element-wise manner, such that a first set of the temporally despread values is effectively multiplied, in an element-wise manner and in a one-step or multi-step multiplication, with a first combined frequency despread sequence, which is a product of a common frequency despread sequence and a first overlay despread sequence, and such that a second set of the temporally despread values is effectively multiplied, in an element-wise manner and in a one-step or multi-step multiplication, with a second combined frequency despread sequence, which is a product of the common frequency despread sequence and a second overlay despread sequence, which is different from the first overlay frequency despread sequence, wherein the first overlay despread sequence and the second overlay despread sequence are orthogonal.

* * * * *

UNITED STATES PATENT AND TRADEMARK OFFICE

CERTIFICATE OF CORRECTION

PATENT NO. : 8,989,885 B2
APPLICATION NO. : 13/584894
DATED : March 24, 2015
INVENTOR(S) : Stefan Wabnik et al.

It is certified that error appears in the above-identified patent and that said Letters Patent is hereby corrected as shown below:

In the claims

The following should be corrected in Claim 18, column 33, line 26 as follows:

"…data from the time-frequency-domain…"

Signed and Sealed this
Twenty-sixth Day of April, 2016

Michelle K. Lee

Michelle K. Lee
*Director of the United States Patent and Trademark Office*